United States Patent
Yamada et al.

(10) Patent No.: US 8,185,500 B2
(45) Date of Patent: May 22, 2012

(54) INFORMATION PROCESSING APPARATUS, AND OPERATION METHOD OF STORAGE SYSTEM

(75) Inventors: Hajime Yamada, Yokohama (JP); Nobuyuki Saika, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 736 days.

(21) Appl. No.: 12/323,026

(22) Filed: Nov. 25, 2008

(65) Prior Publication Data

US 2010/0088282 A1  Apr. 8, 2010

(30) Foreign Application Priority Data

Oct. 6, 2008  (JP) .................................. 2008-260038

(51) Int. Cl.
*G06F 7/00* (2006.01)
*G06F 17/00* (2006.01)

(52) U.S. Cl. ........ 707/646; 707/649; 707/653; 707/654; 707/813

(58) Field of Classification Search .................. 707/609, 707/640, 643, 644, 646, 649, 653, 654, 813, 707/814, 819, 821, 822
See application file for complete search history.

(56) References Cited

U.S. PATENT DOCUMENTS

| | | | |
|---|---|---|---|
| 7,139,875 B2 * | 11/2006 | Nagata ........................... | 711/114 |
| 7,159,072 B2 * | 1/2007 | Kitamura ...................... | 711/112 |
| 7,174,438 B2 * | 2/2007 | Homma et al. ............... | 711/161 |
| 7,275,138 B2 | 9/2007 | Saika | |
| 7,725,436 B1 * | 5/2010 | Park .............................. | 707/639 |
| 2003/0182313 A1 * | 9/2003 | Federwisch et al. .......... | 707/200 |
| 2006/0075200 A1 * | 4/2006 | Satoyama et al. ............ | 711/162 |
| 2007/0067586 A1 * | 3/2007 | Mikami ....................... | 711/162 |

FOREIGN PATENT DOCUMENTS

JP  2006-119688  5/2006

* cited by examiner

*Primary Examiner* — Marc Somers
(74) *Attorney, Agent, or Firm* — Foley & Lardner LLP

(57) ABSTRACT

A server apparatus performs data I/O processing on a P-VOL in response to a request from a client apparatus and includes a file system which receives data write and read requests in units of files from the client apparatus. The server apparatus stores, into a D-VOL, differential data generated by updating the P-VOL, and manages a snapshot management table wherein a block address of the D-VOL storing the acquired differential data is registered. When a remaining capacity of a storage area of the D-VOL becomes equal to or less than a predetermined threshold value, the server apparatus enables a block of the D-VOL which had stored therein the differential data on a certain predetermined file, to be used as a storage area for newly acquired differential data.

11 Claims, 27 Drawing Sheets

LIST OF D-VOL MANAGEMENT METHOD (LIST OF LEVELS)

| LEVEL | CONTENTS |
|---|---|
| 0 | EVEN WHEN DATA DO NOT OVERFLOW D-VOL, D-VOL IS RELEASED AS REQUESTED. |
| 1 | D-VOL IS USED UNTIL DATA OVERFLOWS D-VOL; THEREAFTER, SNAPSHOT FUNCTION IS STOPPED. D-VOL IS DIVERTED TO OTHERS. |
| 2 | D-VOL IS USED UNTIL DATA OVERFLOWS D-VOL; THEREAFTER, D-VOL IS INITIALIZED AND THEN REUSED. |
| 3 | AFTER DATA REACHING UPPER LIMIT OF D-VOL, STORAGE AREAS OF D-VOL ARE RELEASED IN UNITS OF FILES. |
| 4 | D-VOL IS EXTENDED LIMITED NUMBER OF TIMES; THEREAFTER, STORAGE AREAS OF D-VOL ARE RELEASED BY METHOD USED AT LEVEL 3. |
| 5 | NO LIMIT IS IMPOSED ON NUMBER OF EXTENSION TIMES. LU CAN BE ACQUIRED FROM LEVEL 0. |

DIRECTORY ENTRY 312

| DIRECTORY PATH NAME | i NODE NUMBER |
|---|---|
| /home/user-01/···/a.txt | 100 |
| /home/user-02/···/b.txt | 200 |
| ⋮ | ⋮ |

3121 — DIRECTORY PATH NAME
3122 — i NODE NUMBER

FIG. 3B i NODE TABLE 313

| i NODE NUMBER | OWNER | ACCESS RIGHT | SIZE | DATA BLOCK ADDRESS 1 | DATA BLOCK ADDRESS 2 | DATA BLOCK ADDRESS 3 |
|---|---|---|---|---|---|---|
| ⋮ | ⋮ | ⋮ | ⋮ | ⋮ | ⋮ | ⋮ |
| 100 | user001 | urgwrxwrxwrxw | 1000KB | 0-100-3 | 3-200-2 | 5-250-5 |
| ⋮ | ⋮ | ⋮ | ⋮ | ⋮ | ⋮ | ⋮ |

LIST OF D-VOL MANAGEMENT METHOD (LIST OF LEVELS)

| LEVEL | CONTENTS |
|---|---|
| 0 | EVEN WHEN DATA DO NOT OVERFLOW D-VOL, D-VOL IS RELEASED AS REQUESTED. |
| 1 | D-VOL IS USED UNTIL DATA OVERFLOWS D-VOL; THEREAFTER, SNAPSHOT FUNCTION IS STOPPED. D-VOL IS DIVERTED TO OTHERS. |
| 2 | D-VOL IS USED UNTIL DATA OVERFLOWS D-VOL; THEREAFTER, D-VOL IS INITIALIZED AND THEN REUSED. |
| 3 | AFTER DATA REACHING UPPER LIMIT OF D-VOL, STORAGE AREAS OF D-VOL ARE RELEASED IN UNITS OF FILES. |
| 4 | D-VOL IS EXTENDED LIMITED NUMBER OF TIMES; THEREAFTER, STORAGE AREAS OF D-VOL ARE RELEASED BY METHOD USED AT LEVEL 3. |
| 5 | NO LIMIT IS IMPOSED ON NUMBER OF EXTENSION TIMES. LU CAN BE ACQUIRED FROM LEVEL 0. |

FIG. 5

LEVEL MANAGEMENT TABLE 610

| FILE SYSTEM NAME | LEVEL | ACCESS FREQUENCY (NUMBER OF TIMES/TIME) | SNAPSHOT ACQUISITION FREQUENCY (NUMBER OF TIMES/TIME) | SNAPSHOT REFERENCE FREQUENCY (NUMBER OF TIMES/TIME) |
|---|---|---|---|---|
| FS-1 | 2 | 1200 | 25 | 150 |
| FS-2 | 3 | 1500 | 15 | 250 |
| FS-3 | 4 | 2000 | 35 | 500 |
| : | : | : | : | : |

CONDITION FILE 620

```
(0 < NUMBER OF ACCESS USERS < 10) AND (0 < NUMBER OF SNAPSHOTS
< 5) AND (0 < NUMBER OF TIMES OF SNAPSHOT REFERENCES < 10)
AND (0 < ACCESS FREQUENCY < 50 TIMES/TIME) → LEVEL L1

(10 < NUMBER OF ACCESS USERS < 50) AND (5 < NUMBER OF SNAPSHOTS
< 100) AND (NUMBER OF TIMES OF SNAPSHOT REFERENCES < 10)
AND (50 TIMES/TIME < ACCESS FREQUENCY < 500 TIMES/TIME) → LEVEL L2

(50 < NUMBER OF ACCESS USERS < 500) AND (100 < NUMBER OF
SNAPSHOTS < 200) AND -- → LEVEL L3
                      :
DEFAULT: LEVEL 2 (APPLIED WHEN CURRENT STATE FALLS IN NONE OF
ABOVE CONDITIONS AND SUITABLE LEVEL IS NOT DETERMINED)
```

FIG. 6B

FILE SYSTEM MANAGEMENT TABLE 630

| FILE SYSTEM NAME (631) | P-VOL NAME (632) | D-VOL NAME (633) | EXTENDABLE NUMBER OF TIMES OF D-VOL (634) | EXTENDED NUMBER OF TIMES OF D-VOL (635) |
|---|---|---|---|---|
| FS-1 | P-VOL1 | D-VOL1 | 0 | 0 |
| FS-2 | P-VOL2 | D-VOL2 | 1 | 0 |
| : | : | : | : | |

FIG. 6C

LOGICAL VOLUME MANAGEMENT TABLE 640

| LOGICAL VOLUME NAME (641) | NUMBER OF LUs (642) | LU NAME (643) | | |
|---|---|---|---|---|
| P-VOL1 | 1 | LU-1 | | ... |
| D-VOL2 | 2 | LU-2 | LU-3 | ... |
| : | : | : | | ... |

FIG. 6D

LU MANAGEMENT TABLE 650

| LU NAME (651) | LU SIZE (652) | ALLOCATION STATE (653) |
|---|---|---|
| LU-1 | 10GB | NOT ALLOCATED |
| LU-2 | 20GB | ALLOCATED |
| LU-3 | 40GB | ALLOCATED |
| : | : | : |

FIG. 6E

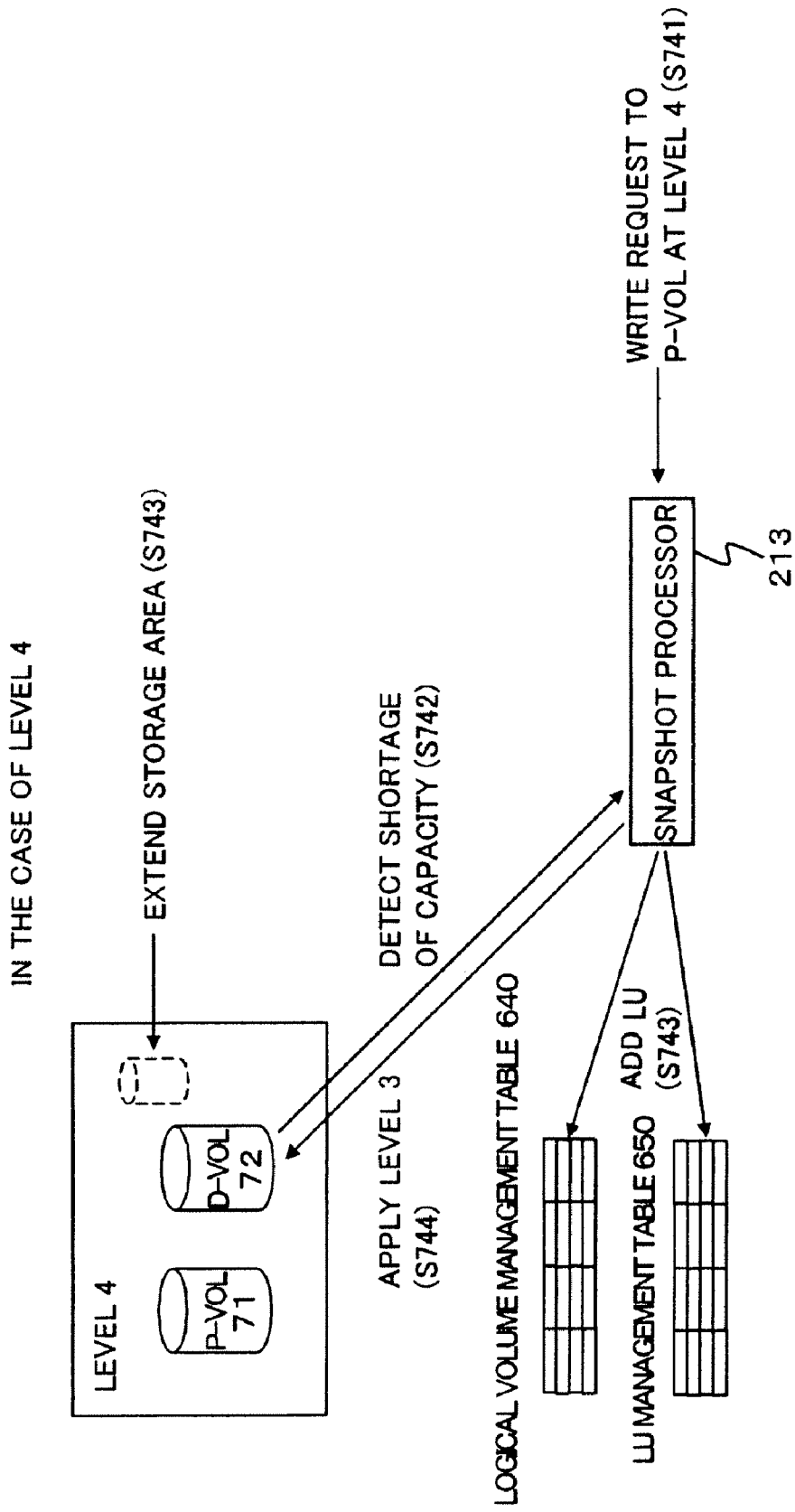

DEFINITION FILE 910

D-VOL UPPER LIMIT: 3  (912)
SNAPSHOT ACQUISITION/FILE PATH NAME FOR HALTING STORING  (911)
/home/user01/a.txt
RELEASABLE GENERATION < SECOND GENERATION  (913)

FIG. 9A i NODE TABLE 313

| PATH NAME | i NODE NUMBER | BLOCK ADDRESS | | | |
|---|---|---|---|---|---|
| /home/user01/a.txt | 10 | 0 | 1 | 2 | 3 |
| /home/user02/b.txt | 20 | 4 | 5 | 6 | 7 |

FIG. 9B

| REMAINING AMOUNT OF D-VOL (931) | CoW LEFT SIDE BIT COLUMN (NECESSARY/NOT NECESSARY TO ACQUIRE SNAPSHOT) (932) | CoW RIGHT SIDE BIT COLUMN (RELEASABLE/NOT RELEASABLE) (933) | CONTENTS OF PROCESS (934) |
|---|---|---|---|
| NOT LARGER THAN THRESHOLD | NOT NECESSARY (ALREADY ACQUIRED) | RELEASABLE | RELEASE |
| | | NOT RELEASABLE | DO NOT RELEASE |
| | NECESSARY | RELEASABLE | DO NOT ACQUIRE SNAPSHOT EVEN WHEN DATA ARE UPDATED |
| | | NOT RELEASABLE | ACQUIRE SNAPSHOT UPON UPDATE |
| LARGER THAN THRESHOLD | NOT NECESSARY (ALREADY ACQUIRED) | RELEASABLE | TAKE NO ACTION SINCE SNAPSHOT IS ACQUIRED |
| | | NOT RELEASABLE | |
| | NECESSARY | RELEASABLE | ACQUIRE SNAPSHOT UPON UPDATE |
| | | NOT RELEASABLE | |

FIG. 9C

D-VOL MANAGEMENT STATE DISPLAY SCREEN 1010

| FILE SYSTEM NAME (1011) | STATUS (LEVEL) (1012) | BACKUP MEASURE OPERATION STATE (1013) | DETAILS (1014) |
|---|---|---|---|
| FS01 | LV1 | NOT APPLIED | — |
| FS02 | LV5 | NOT APPLIED | — |
| FS03 | LV3 | APPLIED | RELEASE IN UNITS OF FILES |
| FS04 | LV4 | APPLIED | EXTENDED (3/4 TIMES) |
| FS05 | LV4 | APPLIED | RELEASE IN UNITS OF FILES |
| FS06 | LV5 | APPLIED | EXTENDED (UNLIMITED) |

FIG. 10A

FILE PROTECTION STATE DISPLAY SCREEN 1020

| SNAPSHOT NAME (1021) | FILE NAME (1022) | STATUS (1023) |
|---|---|---|
| SS-1 | /home/user01/a.txt | PROTECTED |
| | /home/user02/b.txt | NOT PROTECTED |
| | ⋮ | ⋮ |
| SS-2 | /home/user01/a.txt | PROTECTED |
| | /home/user01/a.txt | PROTECTED |
| | ⋮ | ⋮ |
| SS-3 | | |
| | ⋮ | ⋮ |

FIG. 10B

LOG FILE 1510

| TIME AND DATE | FILE SYSTEM NAME | SNAPSHOT NAME (NUMBER OF GENERATIONS) | APPLIED LEVEL | NOTES |
|---|---|---|---|---|
| 2008/7/24 19:00 | FS-1 | 15, OCTOBER | L2 | DELETE ALL SNAPSHOTS |
| : | : | : | : | : |
| 2008/7/24 20:00 | FS-1 | 15-20 | L2 | DELETE ALL SNAPSHOTS |
| : | : | : | : | : |
| 2008/7/24 20:00 | FS-2 | 6, MAY | L3 | DELETE SNAPSHOTS IN UNITS OF FILES (ALL .txt FILES IN /home/user01) |

FIG. 15A

LOG FILE 1520

| TIME AND DATE | FILE SYSTEM NAME | SNAPSHOT NAME (NUMBER OF GENERATIONS) | APPLIED LEVEL | APPLIED FILE DELETION CONDITION (IN CASE OF LEVEL 3) |
|---|---|---|---|---|
| : | : | : | : | : |
| 2008/7/23 12:00 | FS-1 | V-VOL-01 | L2 | — |
| 2008/7/23 12:10 | FS-2 | V-VOL-05 | L3 | /home/user01/*.txt (ALL .txt FILES IN /home/user01) |
| 2008/7/23 13:00 | FS-2 | V-VOL-06 | L3 | /home/user01/*.txt (ALL .txt FILES IN /home/user01) |
| : | : | : | : | : |
| 2008/7/24 18:00 | FS-2 | V-VOL-30 | L3 | /home/user02/*.txt (ALL .txt FILES IN /home/user01) |

FIG. 15B

INFORMATION PROCESSING APPARATUS, AND OPERATION METHOD OF STORAGE SYSTEM

CROSS-REFERENCE TO RELATED APPLICATION

The present application claims priority from Japanese Patent Application No. 2008-260038 filed on Oct. 6, 2008, which is herein incorporated by reference.

BACKGROUND OF THE INVENTION

1. Field of the Invention

The present invention relates to an information processing apparatus and an operation method of a storage system, and more particularly to a technique for properly managing differential volumes used to provide a snapshot function depending on the significance levels of individual data pieces and the like.

2. Related Art

Of the functions of a storage system, there is one (hereinafter referred to as a snapshot function) with which, for a volume in operation (hereinafter referred to as an operational volume), the state at a certain time (hereinafter, the state is called a snapshot) is provided to a user in response to a request from the user or the like. This snapshot function is generally implemented in such a way that data (hereinafter, called differential data) for reproducing the snapshot of a running volume at a certain time are saved in advance in a volume (hereinafter, called a differential volume) different from the operational volume, and that the snapshot at the certain time is reproduced using the present data of the operational volume and the differential data saved in the differential volume.

With this method, when the remaining amount of a differential volume is insufficient, differential data on a newly updated data cannot be managed. To address this problem, for example, Japanese Patent Application Laid-open Publication No. 2006-119688 describes a method in which a use rate of a differential volume and a threshold value are compared, and an update of differential data to the differential volume is controlled depending on whether or not the activity rate is beyond the threshold value.

Significance levels differ between individual data pieces used by a user of a storage system. Accordingly, when operating the storage system, it is preferable that a management method of differential volumes be flexibly set depending on individual data pieces in consideration of the activity states of storage resources usable as differential volumes.

Therefore, an object of the present invention is to provide an information processing apparatus and an operating method of a storage system which are capable of suitably managing differential volumes.

SUMMARY OF THE INVENTION

An aspect of the present invention for solving the above problem is an information processing apparatus that performs a data I/O process on a P-VOL being a first logical volume, in response to a request from an external device, the information processing apparatus comprises a file system that receives write and read requests of data by the file from the external device; a snapshot processing part implemented through executing a corresponding program by a processor of the information processing apparatus that stores, into a D-VOL being a second logical volume, differential data generated by updating data of the P-VOL, and that manages a snapshot management table registering thereon, in association with a first block address identifying a first storage area of the P-VOL, a second block address identifying a second storage area of the D-VOL storing therein the differential data acquired for the first address, to reproduce a snapshot representing a state of the P-VOL at a certain time; and a level determination processing part determining a management method for the D-VOL. In the information processing apparatus, the snapshot processing part manages the D-VOL depending on the level, and the management method is any one of the following methods:

a zeroth method in which a storage area of the D-VOL is enabled to be used as a storage area for newly acquired differential data in response to an external request;

a first method in which the storage area of the D-VOL is automatically enabled to be used as a storage area for newly acquired differential data when a remaining capacity of the storage area of the D-VOL becomes equal to or less than a predetermined threshold value;

a second method in which, of the storage areas storing differential data, those storing old differential data are enabled to be used, in chronological order, as a storage area for newly acquired differential data when the remaining capacity of the storage area of the D-VOL becomes equal to or less than a predetermined threshold value;

a third method in which a block of the D-VOL, the block storing therein differential data on a certain predetermined file, is enabled to be used as a storage area for newly acquired differential data when the remaining capacity of the storage area of the D-VOL becomes equal to or less than a predetermined threshold value;

a fourth method in which the storage area of the D-VOL is extended by adding a logical unit until for a predetermined number of times when the remaining capacity of the storage area of the D-VOL becomes equal to or less than a predetermined threshold value, and a block of the D-VOL in which the differential data on a certain predetermined file had been stored being enabled to be used as a storage area for newly acquired differential data when the adding exceeds the predetermined number of times and the remaining capacity becomes equal to or less than the predetermined threshold value; and a fifth method in which a logical unit is automatically added when the remaining capacity of the storage area of the D-VOL becomes equal to or less than a predetermined threshold value.

The problems and methods for solving such problems disclosed in this application will become apparent from the description in the best mode for carrying out the invention and drawings.

According to the present invention, it is possible to suitably manage differential volumes depending on the significance levels of individual data pieces and the like.

BRIEF DESCRIPTION OF THE DRAWINGS

FIG. 3B is an example of a directory entry 312;

FIG. 3C is an example of an i-node table 313;

FIG. 5 is a diagram showing a list of management methods (Levels) which can be set to a file system 212;

FIG. 6A is an example of a level management table 610;

FIG. 6B is an example of a condition file 620;

FIG. 6C is an example of a file system management table 630;

FIG. 6D is an example of a logical volume management table 640;

FIG. 6E is an example of a logical unit ("LU") management table 650;

FIG. 7D is a diagram for explaining details of a Level 4 process;

FIG. 9A is an example of a definition file 910;

FIG. 9B is an example of the i-node table 313;

FIG. 9C is a diagram showing, in the form of a list, 931 indicating whether the remaining capacity of D-VOL 72 is equal to or less than the threshold, 932 indicating contents of left side bit strings of a CoW bitmap 21352, 933 indicating contents of right side bit strings of the CoW bitmap 21352, and 934 indicating contents of a process made for every combination of the preceding contents;

FIG. 10A is an example of a D-VOL management state display screen 1010;

FIG. 10B is an example of a file protection state display screen 1020;

FIG. 15A is an example of a log file 1510; and

FIG. 15B is an example of a log file 1520.

DETAILED DESCRIPTION OF THE INVENTION

Figure 1A:
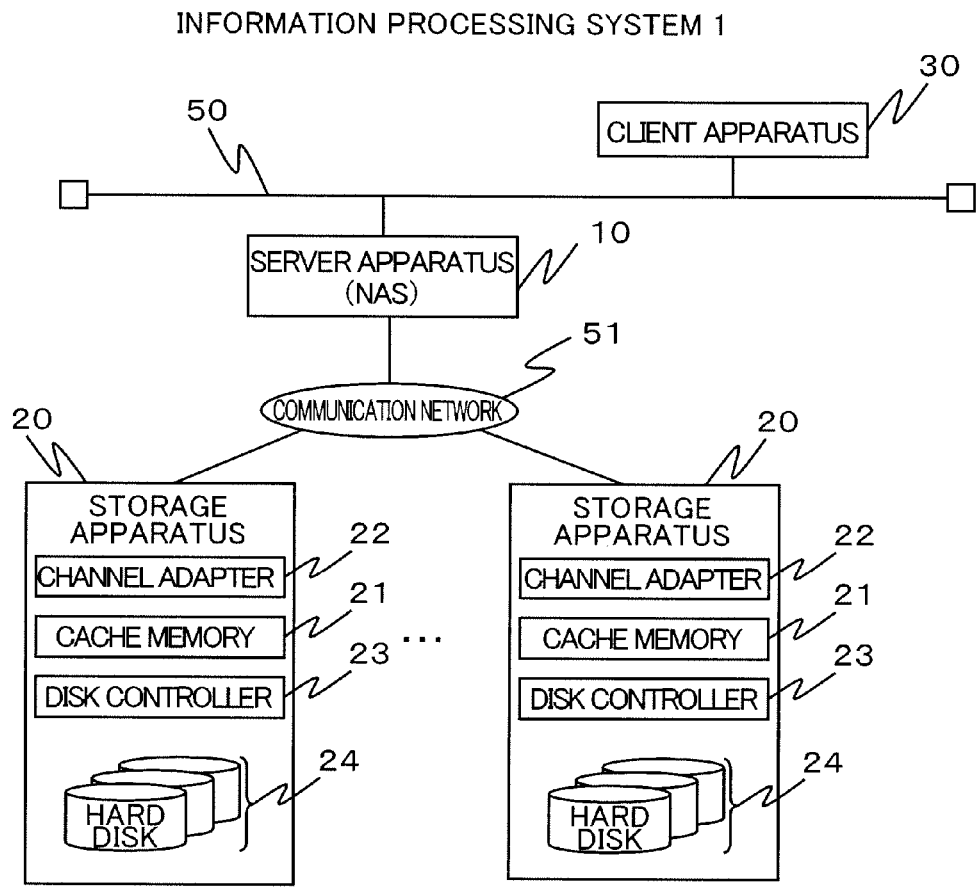
FIG. 1A is a diagram showing hardware of an information processing system 1.

An embodiment of the present invention is described below with reference to the accompanying drawings. FIG. 1A shows a hardware configuration of a information processing system 1 to be described as an embodiment. As shown in FIG. 1A, this information processing system 1 includes a server apparatus 10, storage apparatus 20, and a client apparatus 30.

To the server apparatus 10, one or more client apparatuses 30 (external devices) are coupled via communication network 50. In addition, to the server apparatus 10, one or more storage apparatuses 20 are coupled via communication network 51. The former communication network 50 is, for example, a Local Area Network (LAN), the Internet, or the like. Meanwhile, the latter communication network 51 is, for example, a Storage Area Network (SAN) configured using Fiber Channel, a LAN, or the like.

The client apparatus 30 is a computer (an information processing apparatus) such as a personal computer or a workstation. The server apparatus 10 is a so-called Network Attached Storage (NAS), and functions as a file server to the client apparatus 30. The server apparatus 10 provides the client apparatus 30 with a storage area of the storage apparatus 20 in response to a data input/output request in units of files, transmitted from the client apparatus 30. The server apparatus 10 receives the data input/output request (a data write request, a data read request) transmitted from the client apparatus 30, writes data into or reads data from the storage apparatus 20, and transmits a report on the completion of writing of data, read data, and the like to the client apparatus 30, appropriately.

Figure 1B:
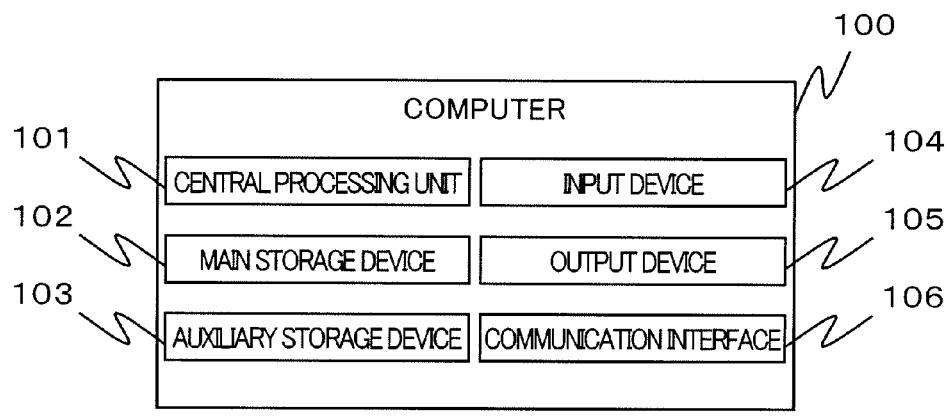
FIG. 1B is a diagram showing an example of a hardware configuration of a computer capable of being used as a server apparatus 10 and client apparatus 30.

FIG. 1B is a diagram showing an example of a computer (information processing apparatus) capable of being used as the server apparatus 10 or the client apparatus 30. As shown in FIG. 1B, this computer 100 includes a central processing unit 101 (e.g., a Central Processing Unit (CPU) or a Micro Processing Unit (MPU)), a main storage device 102 (e.g., a Random Access Memory (RAM) or a Read Only Memory (ROM)) as a memory, an auxiliary storage device 103 (e.g., a hard disk), an input device 104 (e.g., a keyboard or a mouse) which receives an input operation by such as an user or an operator, an output device 105 (e.g., a liquid crystal monitor), and a communication interface 106 (e.g., a Network Interface Card (NIC) or a Host Bus Adapter (HBA)) which achieves communication with other devices.

The storage apparatus 20 provides the above storage area used by the client apparatus 30. The storage apparatus 20 includes a cache memory 21, a channel adapter 22 which performs communication with the server device 10 and which writes and reads data to and from the cache memory 21, and a disk controller 23 which writes and reads data to and from the cache memory 21 as well as writes and reads data to and from the hard disk 24. The storage apparatus 20 has a function to operate the hard disk 24 by a Redundant Array of Inexpensive Disk (RAID 0 to 6) method.

Figure 2:
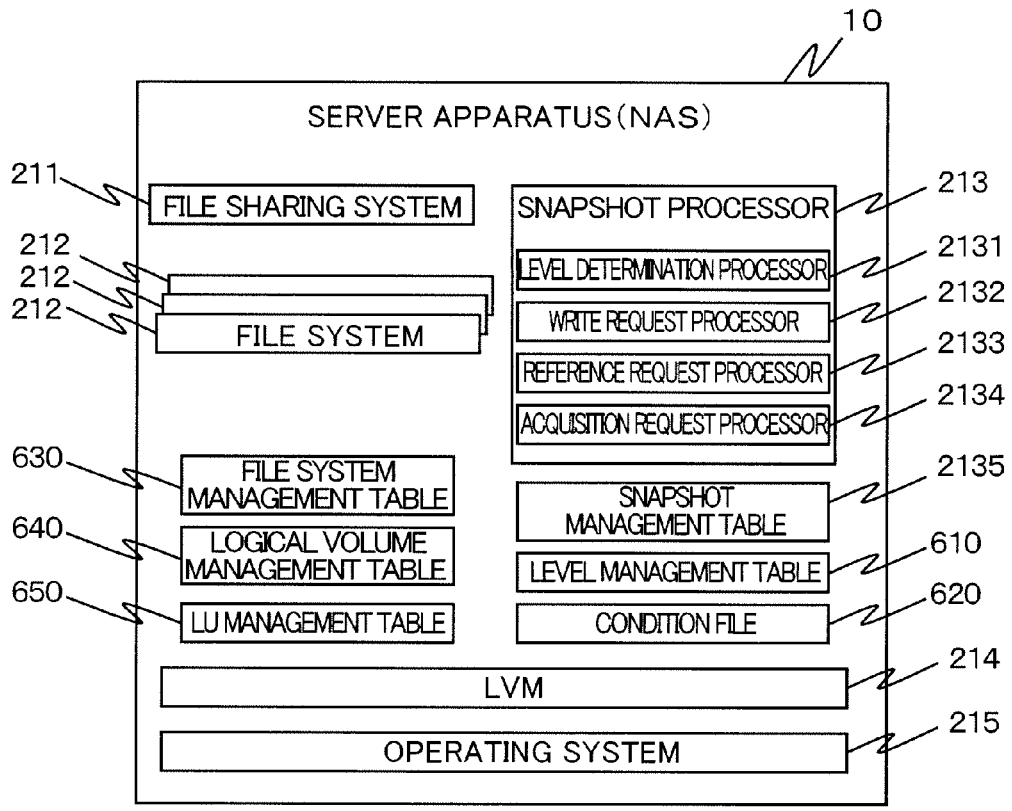
FIG. 2 is a diagram showing main functions of the server apparatus 10.

FIG. 2 shows functions of the server apparatus 10. Incidentally, the functions shown in FIG. 2 are achieved by a central processing unit 101 of the server apparatus 10 executing a program stored in the main storage device 102 or the auxiliary storage device 103, or by a function originally provided to the hardware of the server apparatus 10.

Of the functions shown in FIG. 2, to a device connected to the communication network 50, a file sharing system 211 achieves a mechanism in which data stored in a storage area provided by the storage apparatus 20 are shared in units of files or directories (in units of folders). For specific examples of the file sharing system 211, there are a Network File System (NFS) and a Common Internet File System (CIFS).

A file system 212 achieves a function for causing the device connected to the communication network 50 to access data stored in the storage area provided by the storage apparatus 20, in units of files or directories (in units of folders). As specific examples of the file system 212, there are UNIX®-like file systems and Windows® family file systems. One or more file systems 212 function independently from each other in the server apparatus 10.

Figure 3A:
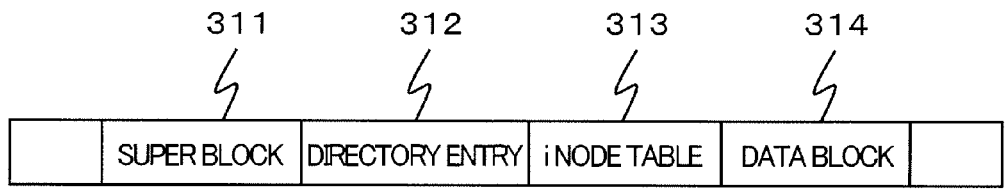
FIG. 3A is an example of file management information 310 managed by file system 212.

The file system 212 manages information (hereinafter, called file management information 310) for achieving the above mechanism. For example, as shown in FIG. 3A, in the case of a UNIX-like file system, the file system 212 manages, as the above information, a super block 311, a directory entry 312, an i node table 313, and a data block 314. Of these, in the super block 311, a size of a storage area, a size of a free space, and the like which are management targets of the file system 212 are managed.

Of the pieces of the information above, a correspondence relationship between a file name (a directory path name 3121) and an i node number 3122 is managed in the directory entry 312, as shown in FIG. 3B. Further, in i node table 313, information (owner 3132) identifying an owner of the file, which are an access right 3133, a file size 3134, and a storage position (address of data block 314 in which data of a corresponding file is stored) of the file are managed so that each of these corresponds to an i node number 3131, as shown in FIG. 3C.

Of the functions shown in FIG. 2, based on a logical unit (hereinafter, called LU) being a unit of a logical storage device provided by the storage apparatus 20, an LVM 214 (LVM stands for Logical Volume Manager) provides an upper layer (file system 212 and the like) with a logical volume (hereinafter, called LV) being a logical storage area. That is, the LVM 214 includes a function which enables an LU to be used as an LV and a function as a device driver which performs writing and reading of data, in units of blocks, to and from the LV.

The LU, being a unit in which the LVM 214 constitutes the LV, is a unit of storage area which an initiator is capable of addressing as a target, for example, in standards of Small Computer System Interface (SCSI) or Attachment Packet Interface (ATAPI). Data block addresses 3135, 3136, and 3137 of the foregoing i node table 313 are block addresses of the LV. As described later, a primary volume (hereinafter, called P-VOL 71 (P-VOL stands for Primary Volume)) and a differential volume (hereinafter, called D-VOL 72 (D-VOL stands for Differential Volume)) in a snapshot function are each achieved as an LV.

Figure 3D:
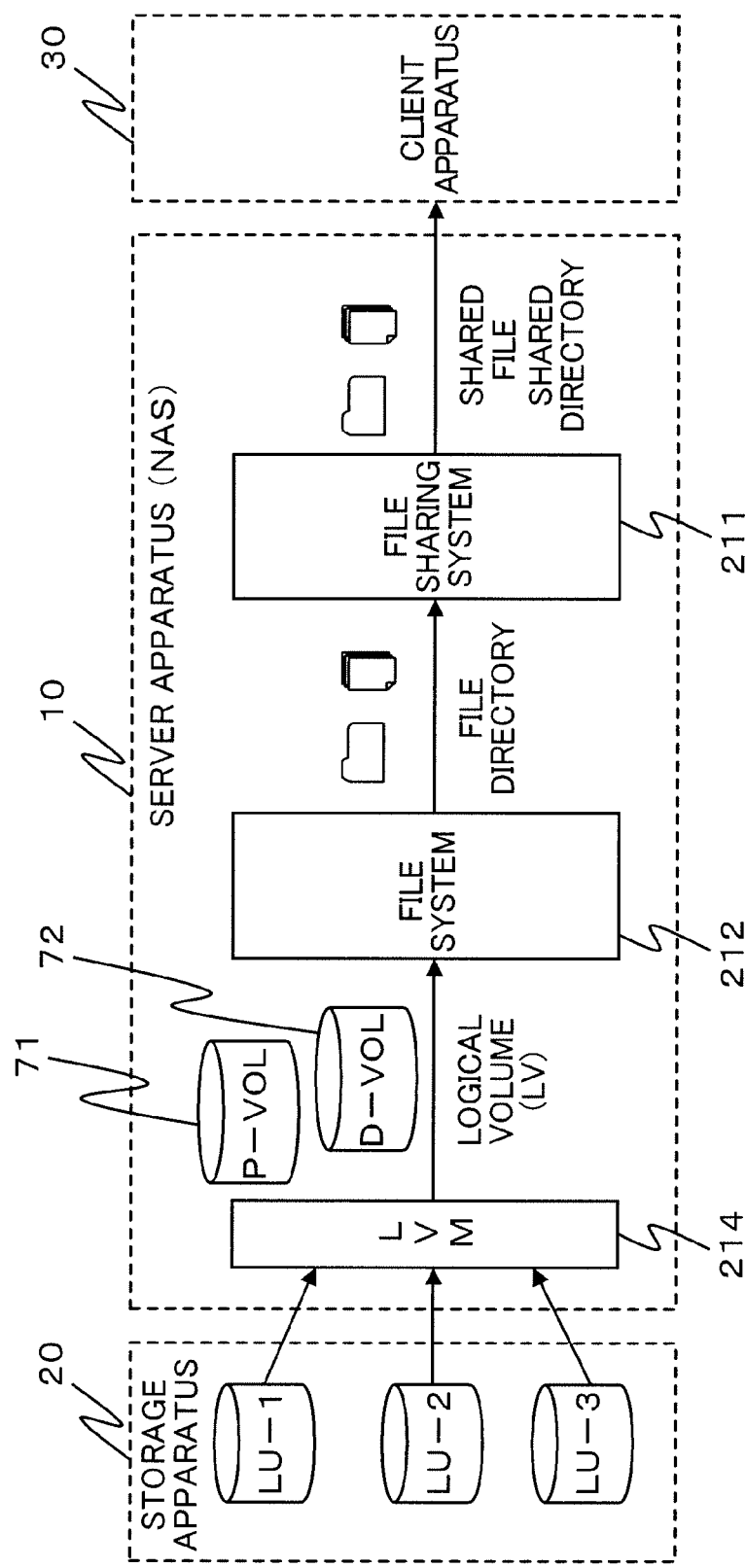
FIG. 3D is a diagram for describing a supply configuration of a storage area from a storage apparatus 20 to a client apparatus 30.

Incidentally, FIG. 3D is a diagram arranging the above contents and describing a supply configuration of a storage area from the storage apparatus 20 to the client apparatus 30.

An operating system 215 shown in FIG. 2 controls data input/output (data I/O) between the server apparatus 10 and the storage apparatus 20.

A snapshot processor 213 shown in FIG. 2 performs various processes relating to the snapshot function. Here, the snapshot function is one which, in response to a request from such as a user or an operator, provides a state of a logical volume (P-VOL 71) at a certain point of time during operation (called a snapshot) The snapshot function is capable of managing snapshots of plurality of generations (states of P-VOL 71 at different plurality of points of time).

A snapshot processor 213 performs a receipt of a snapshot acquisition request transmitted from the client apparatus 30, an acquisition of a snapshot at a certain point of time, a receipt of a snapshot reference request, a provision of a snapshot to the client system 30, an acquisition or reference of a snapshot such as deletion of the snapshot, and various processes related to management of P-VOL 71 and D-VOL 72.

In the following description, the acquisition of a snapshot means to save a block of data (hereinafter, called differential data) updated in P-VOL 71 into D-VOL 72. In addition, the reference (or use) of snapshot means to refer (or use) an acquired snapshot, and the provision of a snapshot means to reproduce a state of P-VOL 71 at a certain point of time in the past, based on present data of P-VOL 71 and on differential data saved in D-VOL 72. Further, the deletion of a snapshot means to delete differential data of a deletion target, from D-VOL 72.

As shown in FIG. 2, the snapshot processor 213 includes various functions such as a level determination processor 2131, a write request processor 2132, a reference request processor 2133, and an acquisition request processor 2134.

Of these, the level determination processor 2131 determines information (hereinafter, called Level) specifying an operation method of a differential volume (D-VOL 72) which is set to each file system 212. Details of the level are described later. When a writing operation is performed on P-VOL 71 by the client apparatus 30, the write request processor 2132 shown in FIG. 2 performs a process in accordance with the above level. When a reference request for a snapshot is made by the client apparatus 30, the refer request processor 2133 shown in FIG. 2 performs a process of providing the client apparatus 30 with a snapshot in accordance with the above level.

When an acquisition request (a request for stating an acquisition of a snapshot on a specific P-VOL 71) of a snapshot is made by the client apparatus 30, the acquisition request processor 2134 performs a process related to acquiring a snapshot in accordance with the above level.

As shown in FIG. 2, the server apparatus 10 manages a table (hereinafter, called a snapshot management table 2135) on which management information of snapshots is retained. On the snapshot management table 2135, information on snapshot for each generation is managed. A snapshot for each generation is managed with data stored in P-VOL 71, data stored in D-VOL 72, and information of the snapshot management table 2135.

Figure 4A:
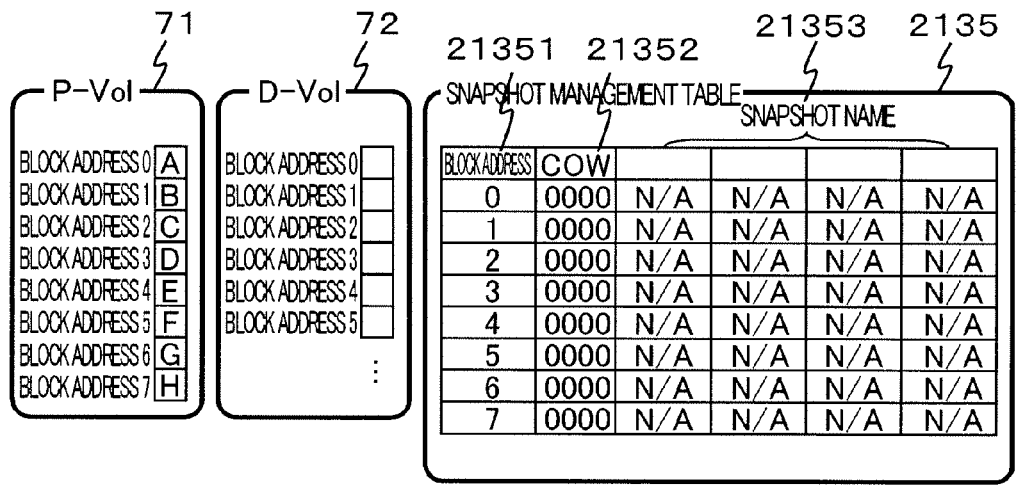
FIG. 4A is a diagram showing a state (an initial state) of P-VOL 71, D-VOL 72, and a snapshot management table 2135.

As shown in FIG. 4A and the like, on the snapshot management table 2135, a CoW (standing for Copy on Write) bitmap 21352, and information (here, a snapshot name 21353) specifying each snapshot are managed so as to correspond to a block address 21351 provided for each data block. Incidentally, the CoW bitmap 21352 is constituted of bit sequences, the number of the bits corresponding to each generation of acquirable snapshots. Further, in the following description, it is assumed that respective bits correspond to a first generation and a second generation in order of bit from the highest bit (leftmost bit) to the lowest bit (rightmost bit).

Referring to FIGS. 4A to 4D, described below are processes of the snapshot processor 213 for a case, as an example, where writing of data onto P-VOL 71 occurs. Further, in the following description, it is assumed that P-VOL 71 and D-VOL 72 each include eight data blocks, and the number of generations of manageable snapshots is four (the CoW bitmap 21352 is of four bits).

FIG. 4A shows states (hereinafter, called initial states) of P-VOL 71, D-VOL 72, and the snapshot management table 2135 before the writing of data onto P-VOL 71. In the initial states, pieces of data represented by "A," "B," "C," "D," "E," "F," "G" and "H" are stored in data blocks corresponding to block addresses 0 to 7 (block addresses 21351) of P-VOL 71, respectively. Since not even one snapshot is acquired, no significant data is stored (e.g., spaces or NULLs are stored) in each of the data blocks of D-VOL 72. Further, each bits of CoW bitmap 21352 of the snapshot management table 2135 are equal to 0, and no data is stored in the snapshot name 21353 (e.g., spaces or NULLs are stored).

Figure 4B:
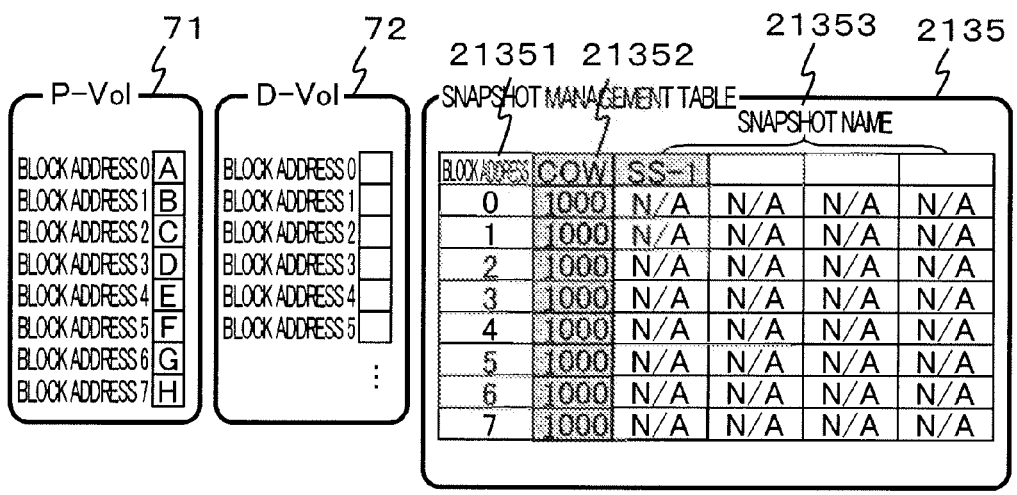
FIG. 4B is a diagram showing a state (a state after receiving a snapshot acquisition request) of the P-VOL 71, the D-VOL 72, and the snapshot management table 2135.

FIG. 4B shows a state after the receiving of an acquisition request for a first snapshot (snapshot name 21353="SS-1") from the client apparatus 30, in the initial state of FIG. 4A. As shown in FIG. 4B, most significant bits (leftmost bits) of the CoW bitmaps 21352 corresponding to each of the block addresses 0 to 7 are set to 1. In the snapshot name 21353, no significant data are stored since a snapshot is not actually acquired yet.

Figure 4C:
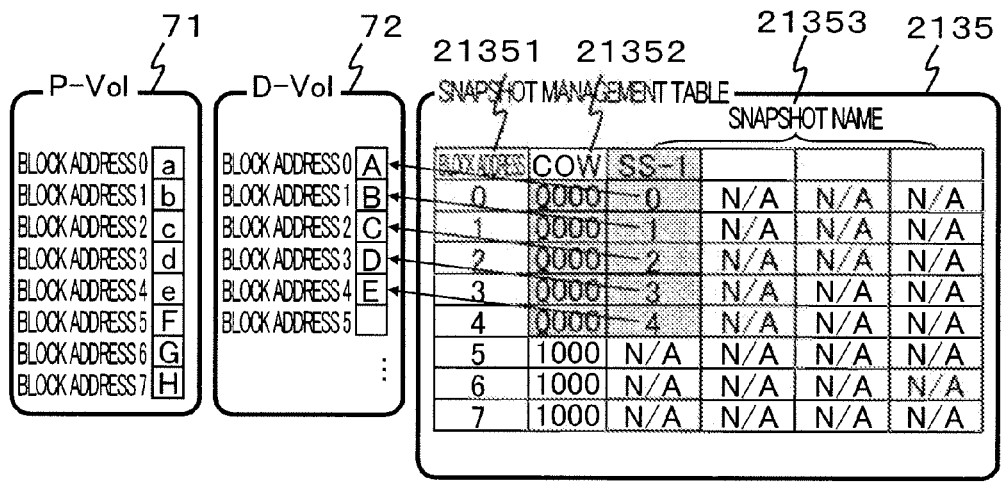
FIG. 4C is a diagram showing a state (a state after updating the P-VOL 71) of the P-VOL 71, the D-VOL 72, and the snapshot management table 2135.

FIG. 4C shows a state after the data blocks at block addresses 0 to 4 of P-VOL 71, in the state of FIG. 4B, are updated with "a," "b," "c," "d" and "e," respectively. As shown in FIG. 4C, previous data "A," "B," "C," "D" and "E" stored at block addresses 0 to 4 are stored (saved) in the data blocks at block addresses 0 to 4 of D-VOL 72. Further, since the first generation snapshots are acquired (data necessary to D-VOL 72 are saved), each of the most significant bits (leftmost bits) of the CoW bitmap 21352 are set (reset) to 0.

Further, since all the bits of the CoW bitmap 21352 are 0s, a snapshot is not acquired even when the data of P-VOL 71 are updated in this state. In field "SS-1" of snapshot name 21353, block addresses "0," "1," "2," "3" and "4" of D-VOL 72 which are the save destination of the previous data "A," "B," "C," "D" and "E" are set so as to correspond to the respective block addresses 21351.

Figure 4D:
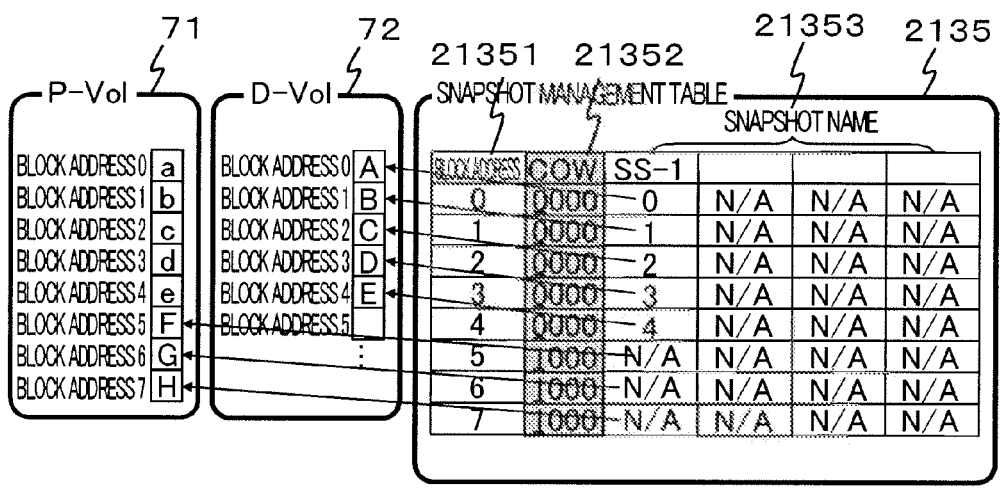
FIG. 4D is a diagram showing a state (when a reference request of a first generation snapshot is made) of the P-VOL 71, the D-VOL 72, and the snapshot management table 2135.

FIG. 4D explains a process of the snapshot processor 213 in the case where a reference request for a first generation snapshot is made from the client apparatus 30, in the state of FIG. 4C. In order to a generate snapshot of data blocks at block addresses 0 to 4, the snapshot processor 213 acquires data stored in the data blocks at block addresses 0 to 4 of D-VOL 72.

Incidentally, the snapshot processor 213 recognizes that the first generation snapshot of the data blocks at block addresses 0 to 4 are present in D-VOL 72, by referring the contents of "SS-1" of snapshot name 21353 of the snapshot management table 2135.

Next, as for the data blocks at the block addresses 5 to 7, the snapshot processor 213 acquires data from data blocks of P-VOL 71. Thereafter, the snapshot processor 213 generates a whole snapshot of P-VOL 71 by combining the data at block addresses 0 to 4 acquired from D-VOL 72 and the data at block addresses 5 to 7 acquired from P-VOL 71, and thereafter transmits the snapshot thus generated to a request source (client apparatus 30).

Referring to FIGS. 4A to 4D, a description has been made above on the case where an acquisition request for a first generation snapshot is made. When acquisition requests of second to fourth generation snapshots are made, the same processes as above are performed.

<Management of D-VOL>

Since the storage area of D-VOL 72 is limited, it is necessary to make efficient use of the storage area of D-VOL 72 in order to maintain the snapshot function. In addition, since there is a difference between the levels of significance on individual pieces of data used by a user or the like, it is preferable that the user or the like is capable of flexibly selecting management methods of differential volumes. Therefore, in this embodiment, a user, an operator, or the like is capable of setting management methods (Levels 0 to 5) of D-VOL 72 for each file system 212. FIG. 5 shows a list of management methods (levels) capable of being set for file systems 212.

As shown in FIG. 5, Level 0 (a 0th method) represents a management method in which D-VOL 72 is freed (to be used for other use by eliminating correspondence with P-VOL 71) in response to a request from the user, the operator, or the like. The freeing of D-VOL 72 aborts an acquisition of snapshots. Incidentally, the freed D-VOL 72 can be used for other use.

Next Level 1 (the first method) represents a management method in which a correspondence with P-VOL 71 is maintained until a remaining capacity of D-VOL 72 drops to a threshold value, but D-VOL 72 is freed when the remaining capacity of D-VOL 72 becomes equal to or less than the threshold value.

Level 2 (the second method) represents a management method in which when the remaining capacity of D-VOL 72 becomes equal to or less than the threshold value, a block storing old differential data is initialized and the initialized block is used as a storage area for a newly acquired differential data.

Level 3 (the third method) represents a management method in which, when the remaining capacity of D-VOL 72 becomes equal to or less than the threshold value, D-VOL 72 is freed in units of files.

Level 4 (the fourth method) represents a management method in which, when the remaining capacity of D-VOL 72 becomes equal to or less than the threshold value, LUs are added for a predetermined number of times, and the storage area of D-VOL 72 is extended. However, when the LUs are added the predetermined number of times and when the remaining capacity of D-VOL 72 becomes equal to or less than the threshold value thereafter, the process of Level 3 is applied so as to free the D-VOL 72.

Level 5 (the fifth method) represents a management method in which, as in the case of Level 4, no limit is provided to the number of times of extension (the extension can be made as long as there exists LUs usable for addition), and when the remaining capacity becomes equal to or less than the threshold, an LU is added to extend the storage area of D-VOL 72. Incidentally, in Level 5, the storage area can also be extended with an LU used by D-VOL 72 that was freed in Level 0.

Moreover, the above-described management methods (Levels) can be set by a user operation through an user interface of the client apparatus 30 or of the server apparatus 10. Further, the level determination processor 2131 of the snapshot processor 213 can automatically set the management methods for each file system 212 based on use states of P-VOL 71 or D-VOL 72, e.g., based on the access frequency of each file system 212 accessing the P-VOL 71, the number of times of snapshot acquisition, and the number of times of snapshot reference.

FIG. 6A is an example of a level management table 610 which is managed by the server apparatus 10. As shown in FIG. 6A, in level management table 610, Levels presently set for each file system 611 (or 212 as shown in FIG. 2) are managed. In level management table 610, for each file system 212, managed are access frequency 613, number of times of snapshot acquisition 614, and number of times of snapshot reference 615, all of which are bases for setting the present Level 612 (in the case of automatic setting).

FIG. 6B is a file (hereinafter, called condition file 620) which is managed by the server apparatus 10, and which is referred to when the level determination processor 2131 determines a Level. As shown in FIG. 6B, in the condition file 620, conditions are set in which values of the access frequency, the number of times of snapshot acquisition and the number of times of snapshot reference are each compared with an upper limit or a lower limit set to each one of the above.

When automatically setting the management method of D-VOL 72 into the file system 212, the level determination processor 2131 refers to the condition file 620. In addition, a condition is described in FIG. 6B that, when the above values fall in none of the conditions set in advance, Level 2 is set as a default value. Contents of the condition file 620 can be set by the user, the operator, or the like by using the input device 104 and the output device 105.

FIG. 6C is a file system management table 630 which is managed by the server apparatus 10. As shown in FIG. 6C, on the file system management table 630, for each file system 212 (file system name), managed are the name of P-VOL 71 (P-VOL name 632) used by a corresponding file system 631 (or 212 as shown in FIG. 2), the name of D-VOL 72 (D-VOL 72 name 633) corresponding to the P-VOL name 632, the number of times that the storage area can be extended (an extendable number 35 of times of D-VOL 634) set to the D-VOL 72, and the extended number of times of the storage area of D-VOL 72 (an extended number of times of D-VOL 635). In this embodiment, it is assumed that one extension causes one LU to be added to D-VOL 72.

FIG. 6D is a logical volume management table 640 which is managed by server apparatus 10. As shown in FIG. 6D, in the logical volume management table 640, for each logical volume (P-VOL 71 or D-VOL 72) (in logical volume name 641), the number of LUs (number of LUs 642) constituting a corresponding logical volume, and an LU identifier (LU name 643) are managed. The LU identifier represents, for example, a Logical Unit Number (LUN)

FIG. 6E is an LU management table 650 which is managed by the server apparatus 10. As shown in FIG. 6E, in the LU management table 650, managed are storage capacities (LU size 652) of each of LUs (LU name 651), and whether each of the LUs have been already allocated (to P-VOL 71 or D-VOL 72) (allocation state 653).

<Details of Each Management Method>

Next, processes of each management method are described in detail.

Figure 7A:
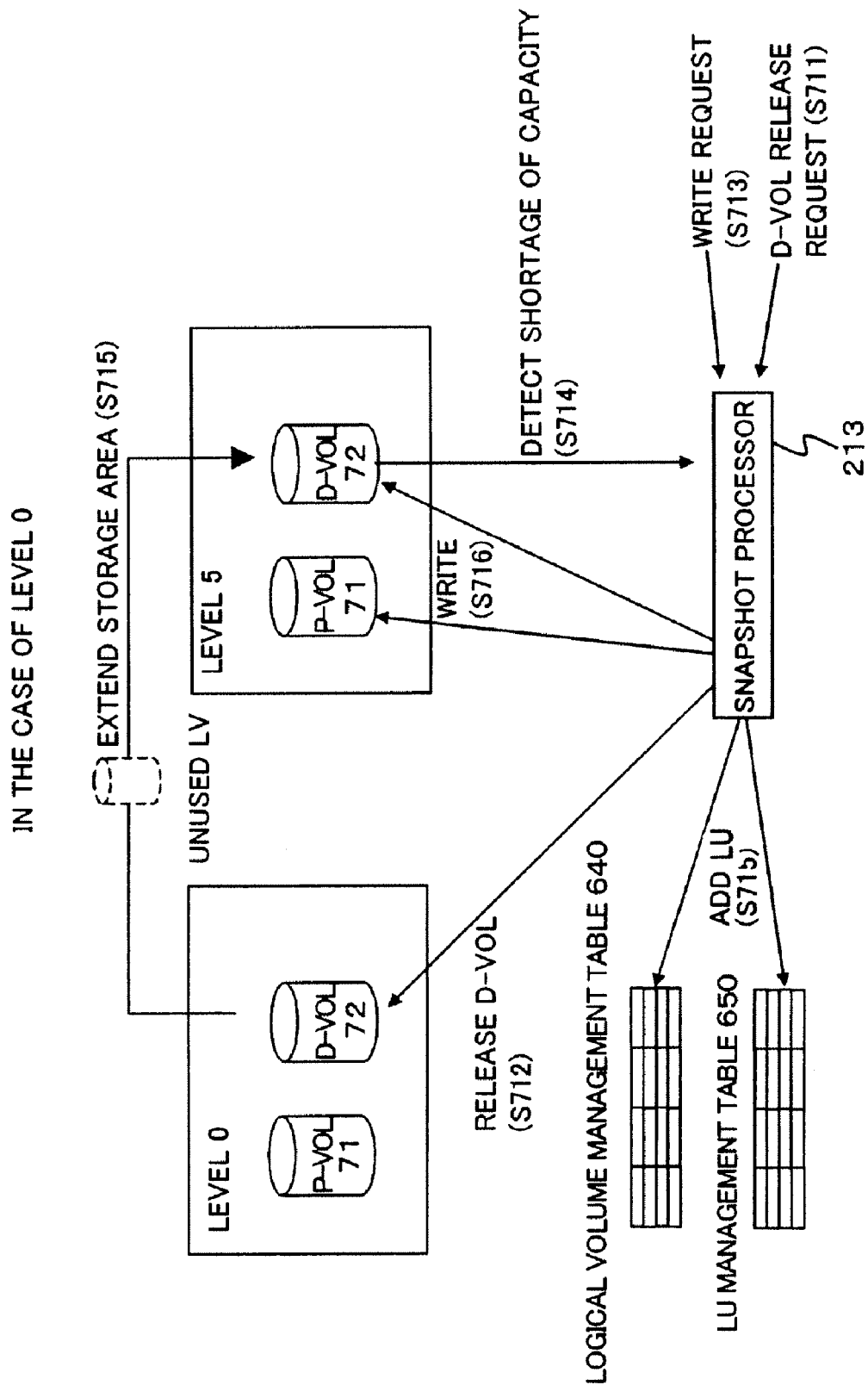
FIG. 7A is a diagram for explaining details of a Level 0 process.

In FIG. 7A, details of a Level 0 process are shown. As described above, Level 0 represents the management method in which D-VOL 72 is released in response to a request from the user, the operator, or the like, and allows the released D-VOL 72 to be used for other use (e.g., as an LU to be added in Level 5). In the following description, the letter "S" preceding each number stands for Step.

As shown in FIG. 7A, once receiving a release request from the client apparatus 30 on D-VOL 72 in Level 0 (S711), the snapshot processor 213 releases the D-VOL 72 (aborts acquiring a snapshot) (S712).

There is a case where the snapshot processor 213 requests to write after releasing the D-VOL 72 (S713). Here, when detecting that the remaining capacity of the D-VOL 72 of Level becomes equal to or less than a threshold value (S714), the snapshot processor 213 updates the logical volume management table 640 and the LU management table 650, adds the LU which has been used as the released D-VOL 72 in S711, and extends the storage area of the D-VOL 72 of Level 5 (S715). Thereafter, the snapshot processor 213 writes writing target data of the write request onto a P-VOL 71, and writes differential data into the D-VOL 72 (S716).

According to the Level 0 process, the storage area of the D-VOL 72 of Level 0 can be actively reallocated to the D-VOL 72 of Level 5. Thus, this method is effective, for example, when preferentially securing the storage area of the D-VOL 72 of Level 5.

Figure 7B:
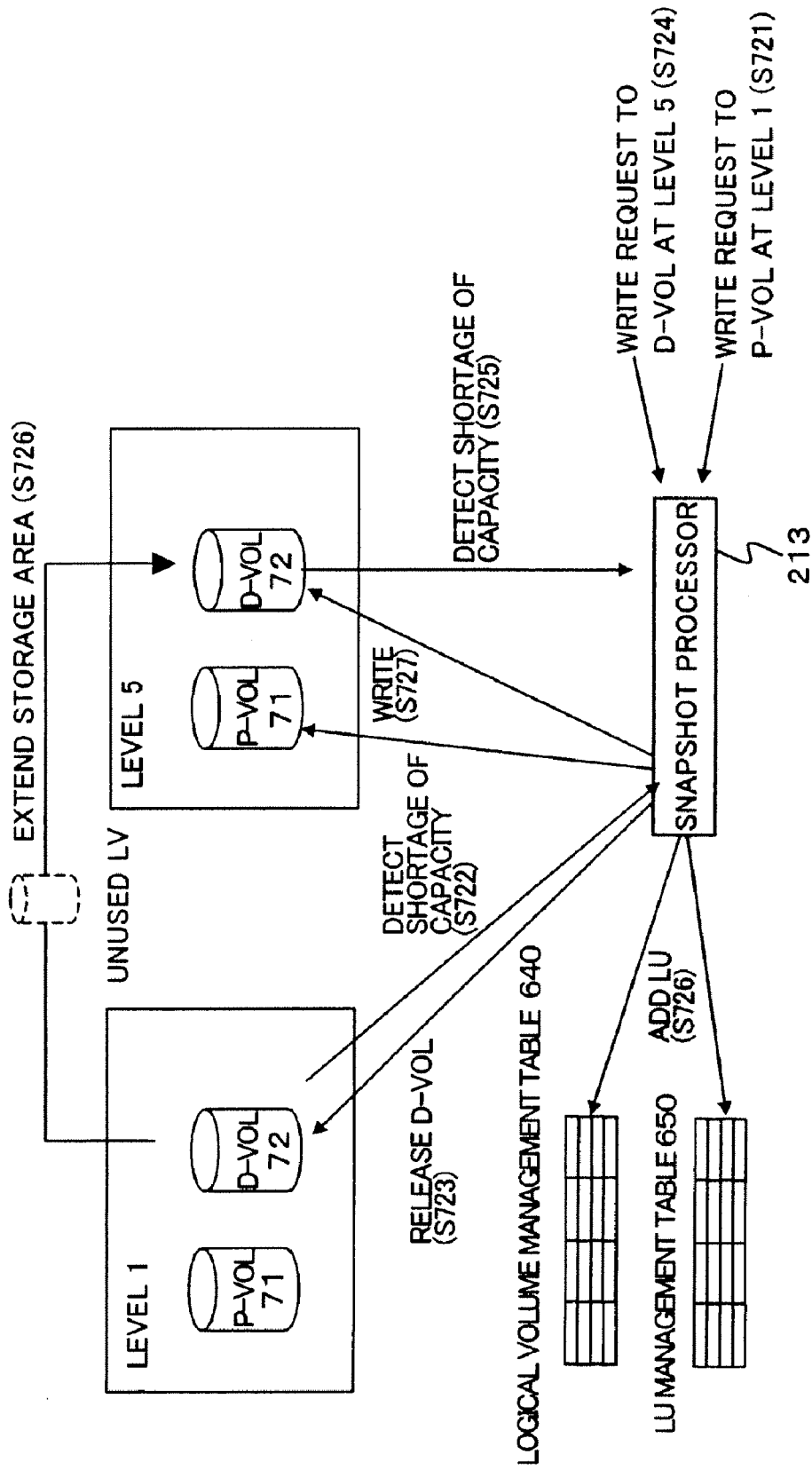
FIG. 7B is a diagram for explaining details of a Level 1 process.

In FIG. 7B, details of the Level 1 process are shown. As described above, Level 1 represents the management method in which a correspondence between D-VOL 72 and P-VOL 71 is maintained (acquires a snapshot) until a remaining capacity of D-VOL 72 becomes equal to or less than a threshold value, but D-VOL 72 is released (aborts acquiring the snapshot) when the remaining capacity of D-VOL 72 becomes equal to or less than the threshold value.

As shown in FIG. 7B, there is a case where the snapshot processor 213 receives, from the client apparatus 30, a write request of writing into the P-VOL 71 in Level 1 (S721). Here, when detecting that the remaining capacity of D-VOL 72, corresponding to the P-VOL 71 being a writing target, becomes equal to or less than a threshold value (S722), the snapshot processor 213 releases the D-VOL 72 (aborts acquiring the snapshot) (S723).

There is a case where the snapshot processor 213 receives a write request after releasing the D-VOL 72 (S724). Here, when it is detected that the remaining capacity of the D-VOL 72 of Level becomes equal to or less than a threshold value (S725), the snapshot processor 213 updates the logical volume management table 640 and the LU management table 650, adds the LU which has been used as the D-VOL 72 released at S711, and extends the storage area of the D-VOL 72 of Level 5 (S726). Thereafter, the snapshot processor 213 writes writing target data of a write request into a P-VOL 71, and writes differential data into the D-VOL 72 (S727)

According to the process of Level 1, when the remaining capacity of the storage area of the D-VOL 72 of Level 1 becomes equal to or less than a threshold value, the storage area of the D-VOL 72 can be actively reallocated to the D-VOL 72 of Level 5. Thus, the storage area of the D-VOL 72 of Level 5 can be preferentially secured. Further, in Level 0, the D-VOL 72 is not released unless there is a release request made by the user, the operator, or the like. However, in Level 1, the D-VOL 72 can be automatically released.

Figure 7C:
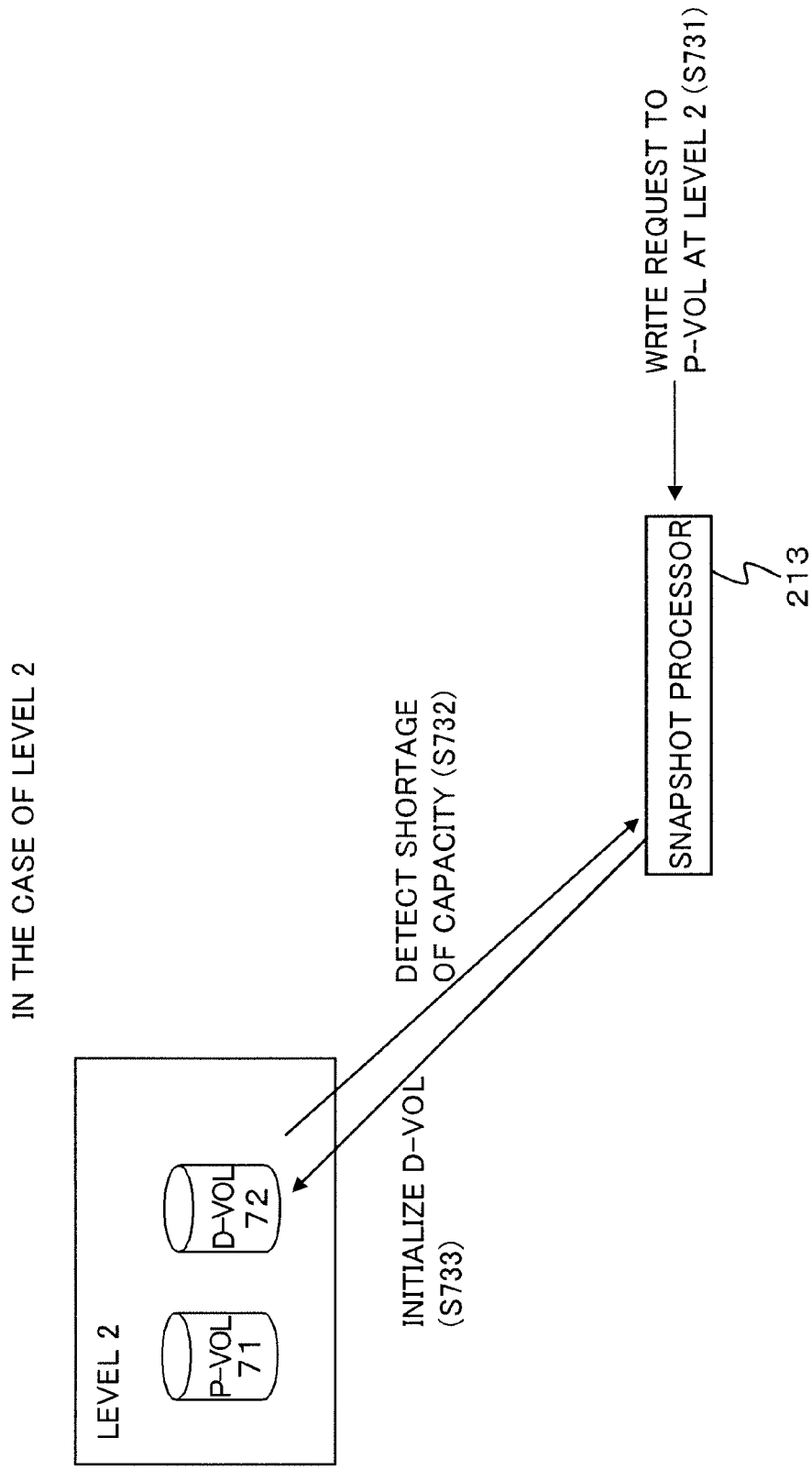
FIG. 7C is a diagram for explaining details of a Level 2 process.

In FIG. 7C, Level 2 process is shown in detail. As described above, Level 2 represents the management method in which, when the remaining capacity of D-VOL 72 becomes equal to or less than the threshold value, a block in which old differential data are stored is initialized, and the initialized block is used as a storage area for a newly acquired differential data.

As shown in FIG. 7C, there is a case where the snapshot processor 213 receives (S731), from the client apparatus 30, a write request to write into the P-VOL 71 in Level 2. When detecting that the remaining capacity of D-VOL 72 corresponding to the writing target P-VOL 71 is equal to or less than a threshold value (S732), the snapshot processor 213 initializes the D-VOL 72 (S733).

According to the Level 2 process, when the remaining capacity of the storage area of the D-VOL 72 of Level 1 becomes equal to or less than the threshold value, the D-VOL 72 is initialized, so that the storage area of the D-VOL 72 can be increased. The Level 2 process is effective when the discarding of an acquired snapshot does not have much adverse effect on an operation. Further, in the Level 2 process, since the storage area of the D-VOL 72 is not extended, an unused storage area can be secured for other use.

Level 3 represents the management method in which when the remaining capacity of the D-VOL 72 becomes equal to or less than the threshold value, the D-VOL 72 is released by the file. Details of Level 3 process is described below by referring to FIGS. 8A to 8H. In the following description, the P-VOL 71 and the D-VOL 72 each have eight data blocks, and the number of manageable generations of snapshot is two.

Figure 8A:
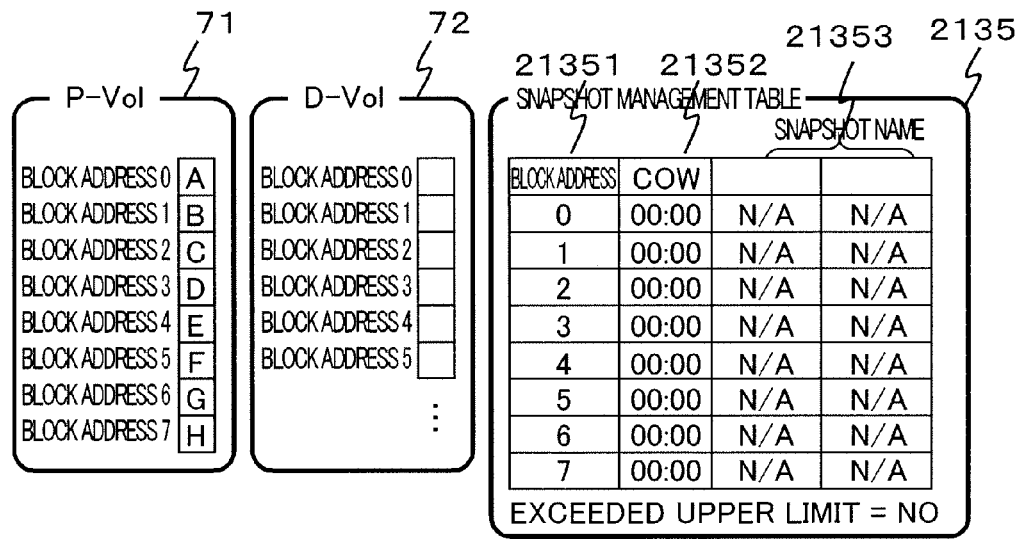
FIG. 8A is a diagram showing a state (an initial state) of the P-VOL 71, the D-VOL 72, and the snapshot management table 2135, which are used for explaining in detail a Level 3 process.

FIG. 8A shows a state of P-VOL 71, D-VOL 72, and the snapshot management table 2135 before writing data into a P-VOL 71 (hereinafter, called initial state). As shown in FIG. 8A, in the initial state, "A," "B," "C," "D," "E," "F," "G" and "H" are stored in data blocks corresponding to block addresses 0 to 7 (block address 21351) of P-VOL 71, respectively. Since not even one snapshot is acquired in the initial state, no data is stored (e.g., spaces or NULLs are stored) in respective data blocks of D-VOL 72.

Bit strings on the left side of the colon ":" of the CoW bitmap 21352 in the snapshot management table 2135 indicates, from the left, whether it is necessary to acquire snapshots of first generation and second generation. Bit strings on the right side of the colon ":" indicates, in an order from the left, whether it is possible to acquire snapshots of first generation and second generation. In the initial state, all bits of the right side bit strings and the left side bit strings are set to 0. Further, in snapshot name 21353, no data is stored (e.g., spaces or NULLs are stored).

Level 3 represents the management method in which, when the remaining capacity of the D-VOL 72 becomes equal to or less than the threshold value, the D-VOL 72 is released in units of files. Therefore, the right side bit strings of the CoW bitmap 21352 is set to 1 when block addresses of the bit strings are those of blocks which store file data for aborting an acquisition of snapshot.

The file name (file path name) of a file capable of aborting an acquisition of snapshot is described in a definition file 910 exemplified in FIG. 9A. The definition file 910 is set by the user, the operator, or the like, and stored in the server apparatus 10, for example. As shown in FIG. 9A, in the definition file 910, described are a threshold value 912 of the D-VOL 72, and a generation range 913 capable of aborting an acquisition of a snapshot among snapshots corresponding to data of the file, in addition to the above file name (file path name 911) of a file capable of stopping an acquisition of snapshot when the remaining capacity of the D-VOL 72 is small.

Meanwhile, in the D-VOL 72 and the snapshot management table 2135, snapshots are managed in units of blocks. Therefore, when setting the right side bit strings of the CoW bitmap 21352, the snapshot processor 213 refers to i node table 313 (i node table 313 is exemplified in FIG. 9B) of the file system 212 to identify the block address in which the file data are stored.

Figure 8B:
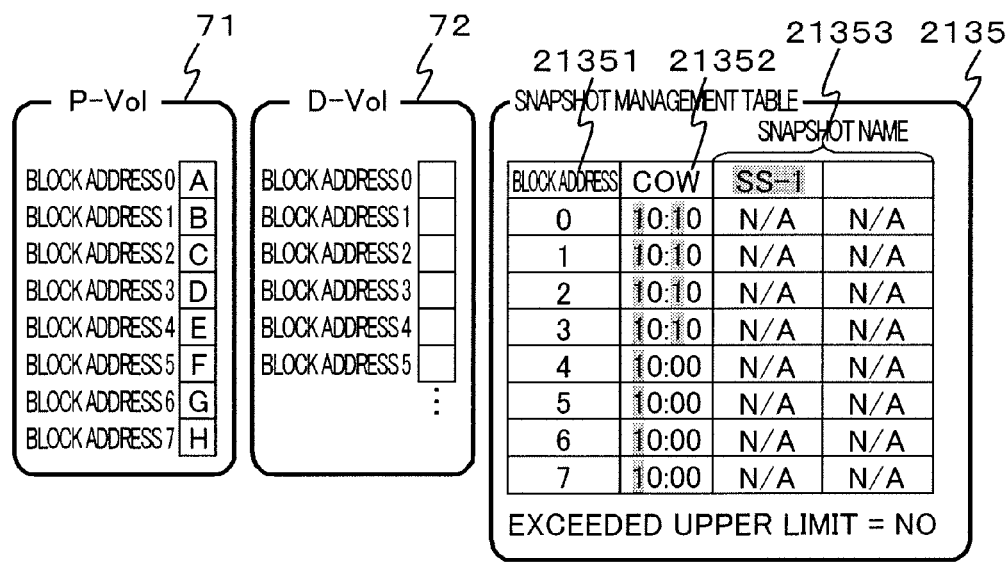
FIG. 8B is a diagram showing a state (state where a first generation snapshot acquisition request is received) of the P-VOL 71, the D-VOL 72, and the snapshot management table 2135, which are used for explaining in detail the Level 3 process.

FIG. 8B shows a state of the initial state of FIG. 8A after receiving an acquisition request of a first generation snapshot (snapshot name 21353=SS-1) from the client apparatus 30. As shown in FIG. 8B, the first generation bits (leftmost bits) of the left side bit strings of the CoW bitmap 21352 corresponding to the block addresses 0 to 7 are each set to 1.

In the block addresses 0 to 4 of the CoW bitmap 21352, first generation bit strings (leftmost bit) of the right side bit strings are each set to 1. This setting is made in such a way that the snapshot processor 213 identifies, from the i node table 313, a block address in which file data with a file name (a file represented, for example, byhome/user01/a.txt) of the definition file 910. In the snapshot name 21353, "SS-1" is set as an item name, but actually since a snapshot has not been acquired yet, no content exists.

Figure 8C:
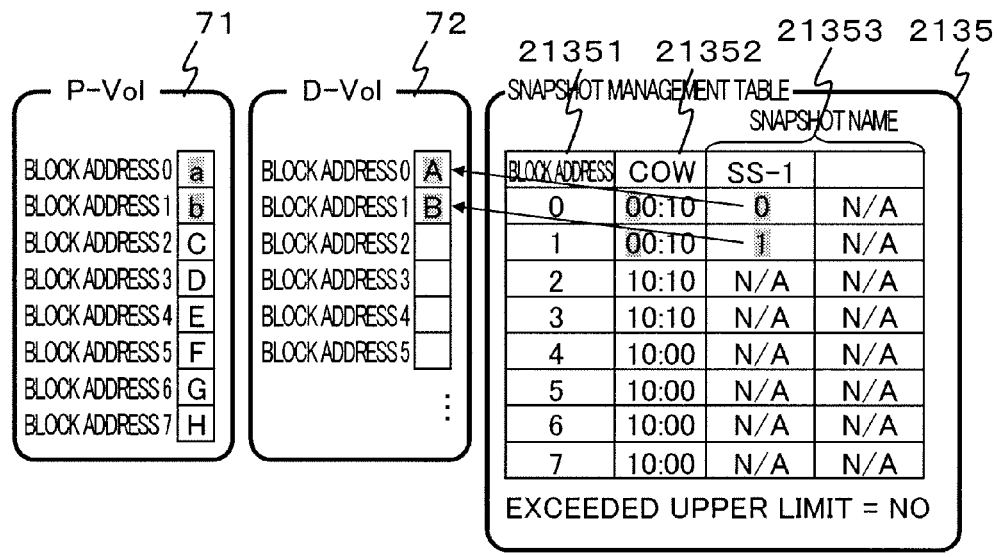
FIG. 8C is a diagram showing a state (when a file has been updated) of the P-VOL 71, the D-VOL 72, and the snapshot management table 2135, which are used for explaining in detail the Level 3 process.

FIG. 8C shows a case where, a file is updated from the state of FIG. 8B and data of the block address 0 to 1 of P-VOL 71 have been updated from "AB" to "ab." This causes data "AB" before updating to be stored in the block addresses 0 to 1 of D-VOL 72. Further, since the first generation snapshot is acquired, the first generation bits (leftmost bits) of the left side bit strings of the CoW bitmap 21352 of block addresses 0 to 1 of the snapshot management table 2135 have each been changed from 1 to 0. In the field of "SS-1" of the snapshot name 21353, block addresses of the D-VOL 72 in which differential data "AB" are stored are set.

Figure 8D:
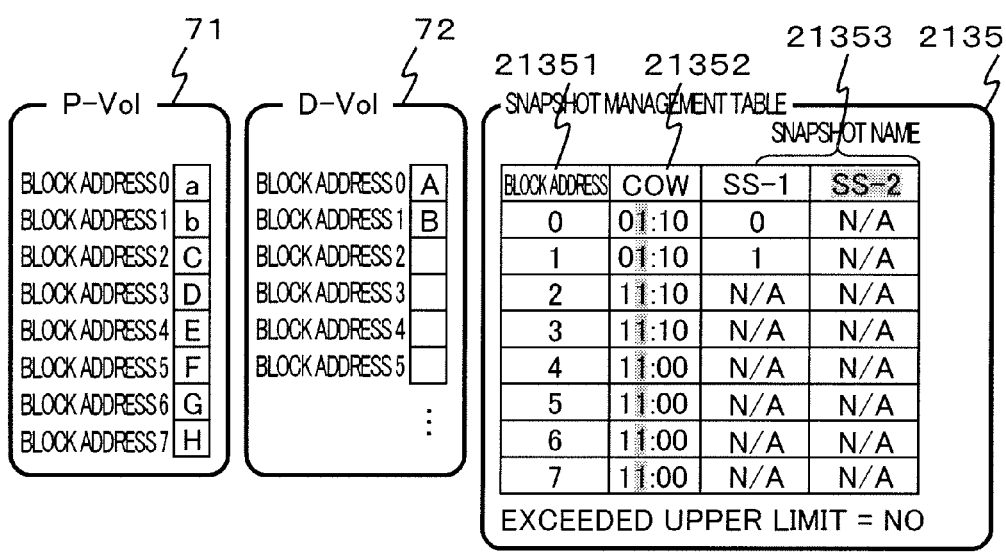
FIG. 8D is a diagram showing a state (state where the first generation snapshot acquisition request is received) of the P-VOL 71, the D-VOL 72, and the snapshot management table 2135, which are used for explaining in detail the Level 3 process.

FIG. 8D shows a state of FIG. 8C after receiving a second generation snapshot acquisition request (snapshot name 21353=SS-2). The second generation bits (rightmost bits) of the left side bit strings of the CoW bitmap 21352 corresponding to the block addresses 0 to 7 of the snapshot management table 2135 are each set to 1. In the snapshot name 21353, "SS-2" is set as an item name, but actually since a snapshot has not been acquired yet, no content exists. Further, unlike the case in FIG. 8B, in the block addresses 0 to 4 of the CoW bitmap 21352, the second generation bits (rightmost bits) of the right side strings each remain 0. This is because a generation which can be released for the file (/home/user01/a.txt) is limited to the first generation (<second generation) in the definition file 910 shown in FIG. 9A.

Figure 8E:
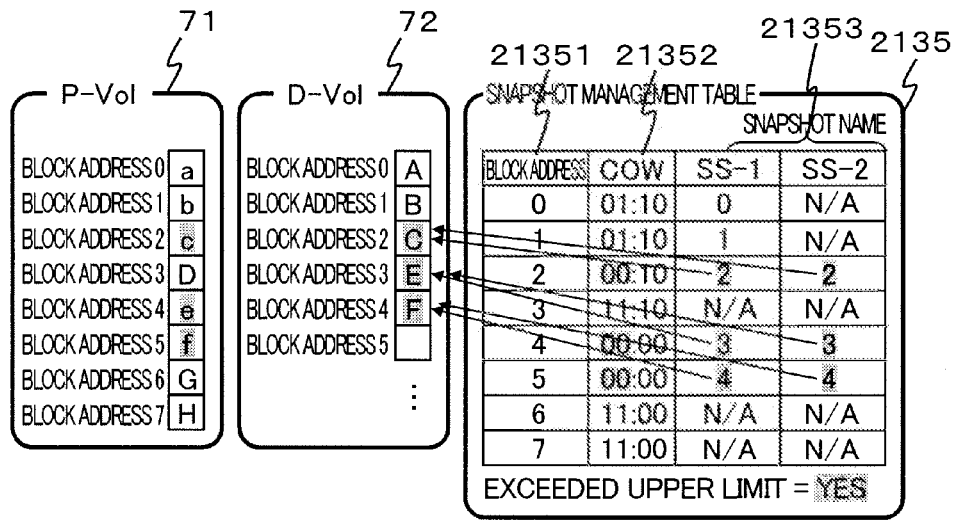
FIG. 8E is a diagram showing a state (when the remaining capacity of D-VOL 72 is equal to or less than a threshold value) of the P-VOL 71, the D-VOL 72, and the snapshot management table 2135, which are used for explaining in detail the Level 3 process.

FIG. 8E shows a case where a first file (e.g., /home/user01/a.txt) is updated so that data of the block addresses 0 to 3 are changed from "abCD" to "abcD," and where a second file (e.g., /home/user02/b.txt) is updated so that data of the block addresses 4 to 7 are changed from "EFGH" to "efGH" and where the remaining capacity of the D-VOL 72 becomes equal to or less than the threshold value. This causes "C," "E," and "F" to be stored in the block addresses 2 to 4 of the D-VOL 72. In addition, since the remaining capacity of the D-VOL 72 becomes equal to or less than the threshold value, the releasing of the D-VOL 72 is first performed. That is, among the pieces of data of the D-VOL 72, piece of data which agrees with all of the following condition is released: a first generation bit of the left side bit string is 0 (snapshot has already been acquired); a first generation bit of the right side bit string is 1 (can be released), and the piece of data is of the first generation (in accordance with the definition file 910). Data which agree with the above condition are those of the block addresses 0 to 1 of the D-VOL 72.

Figure 8F:
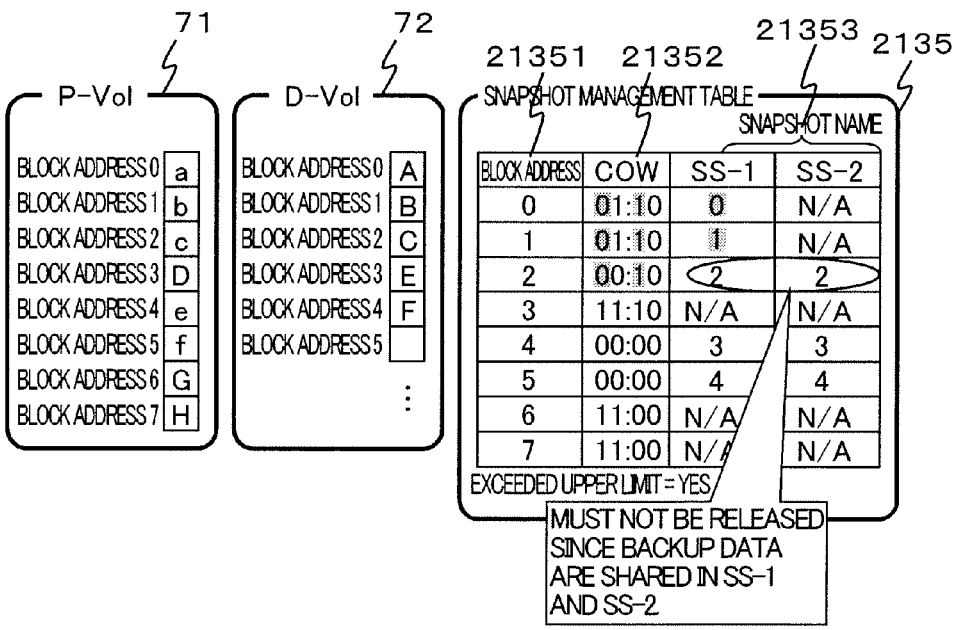
FIG. 8F is a diagram showing a state of the P-VOL 71, the D-VOL 72, and the snapshot management table 2135, which are used for explaining in detail the Level 3 process.
Figure 8G:
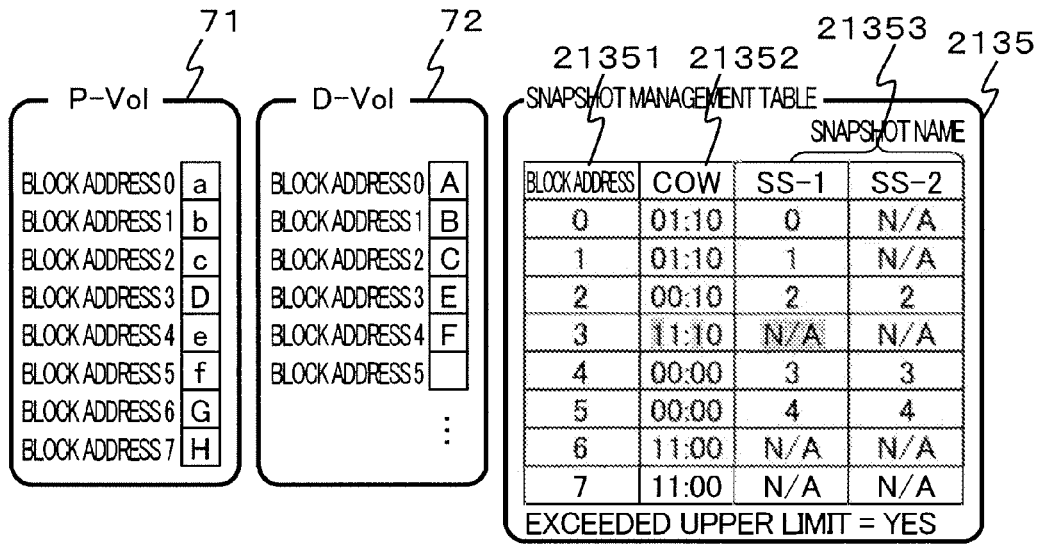
FIG. 8G is a diagram showing a state of the P-VOL 71, the D-VOL 72, and the snapshot management table 2135, which are used for explaining in detail the Level 3 process.

Meanwhile, since data of snapshot "SS-2" are stored in the block address 2, it can not be released (refer to FIG. 8F). Further, for a block address (e.g., block address 3) with a bit of the left side bit strings of the CoW bitmap 21352 being 1 (snapshot is not acquired), and with a bit of the right side bit strings of a generation corresponding to the former bit being 1 (capable of being released), a snapshot is not acquired even when the P-VOL 71 is updated (refer to FIG. 8G) hereafter.

FIG. 9C is a list showing, 931 indicating whether a remaining capacity of D-VOL 72 is equal to or less than the threshold value, 932 indicating contents of left side bit strings of a CoW bitmap 21352, 933 indicating contents of right side bit strings, and 934 indicating contents of a process made in combination of these preceding contents.

Figure 8H:
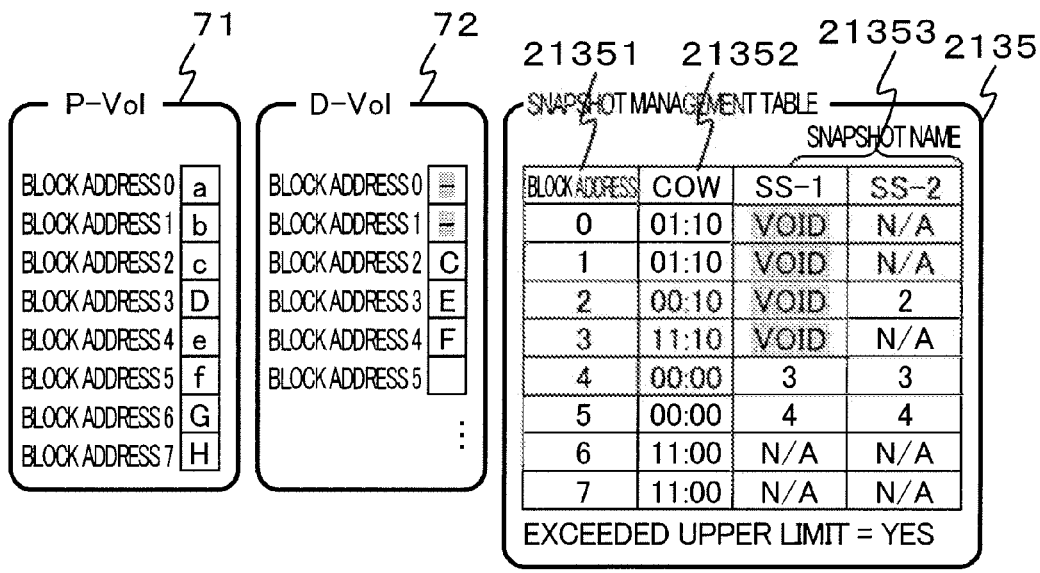
FIG. 8H is a diagram showing a state (a state at the time when part of D-VOL has been released) of the P-VOL 71, the D-VOL 72, and the snapshot management table 2135, which are used for explaining in detail the Level 3 process.

FIG. 8H shows a state in which part of the D-VOL 72 is released by performing the above processes. In FIG. 8H, block addresses indicated with hyphen "-" in D-VOL 72 are released parts. For example, when the snapshot SS-1 of the first file (/home/user01/a.txt) is attempted to be referred to in this state, an error is returned to the request source (e.g., client apparatus 30). Here, SS-2 can be read, and when a reference request on SS-2 is made, a snapshot is generated to be transmitted to a request source. On the second file (/home/user02/b.txt), both snapshots SS-1 and SS-2 can be read, and when a refer request is made, a snapshot is transmitted to the request source.

As described above, according to Level 3 process, the storage area of the D-VOL 72 can be released in units of files. In addition, for example, by defining files with low levels of importance in the defining file 910, these files with low levels of importance can be released preferentially than files with high levels of importance. Also, by defining the generation which can be released on the defining file 910, only the generation which may be released can be set as a target of the release among the snapshots.

FIG. 7D shows details of Level 4 process. As described above, Level 4 represents the management method in which when the remaining capacity of D-VOL 72 becomes equal to or less than the threshold value, LUs are added to extend the storage area of D-VOL 72, for a predetermined number of times. However in this management method, when LUs are already added the predetermined number of times and the remaining capacity of D-VOL 72 becomes equal to or less than the threshold value, the process of Level 3 is applied to release D-VOL 72.

As shown in FIG. 7D, there is a case where the snapshot processor 213 receives, from the client apparatus 30, a write request to the P-VOL 71 in Level 4 (S741). Here, when detecting that the remaining capacity of D-VOL 72 corresponding to the writing target P-VOL 71 is equal to or less than a threshold value (S742), the snapshot processor 213 updates the logical volume management table 640 and the LU management table 650, and extends the storage area of the D-VOL 72 by adding an LU (S743).

When the D-VOL 72 is repeatedly extended by the adding of LUs and the number of times of extension exceeds a predetermined number, the snapshot processor 213 performs the process of Level 3 (releasing the D-VOL 72 by the file) (S744).

According to the Level 4 process, when the remaining capacity of D-VOL 72 is equal to or less than the threshold value, LUs are added to extend the storage of D-VOL 72 until the number of times of addition reaches a predetermined number. Hence, Level 4 process is effective when it is necessary to retain a snapshot for a certain period of time. In addition, when LUs are already added the predetermined number of times and the remaining capacity of D-VOL 72 is equal to or less than the threshold value, the process of Level 3 is applied to release D-VOL 72. Accordingly, reserved LUs can be prevented from being used. Further, in this case, since the storage area of the D-VOL 72 is released in units of files, files with low levels of importance can be released preferentially than files with high levels of importance by defining the files with low levels of importance in the defining file 910, for example.

Figure 7E:
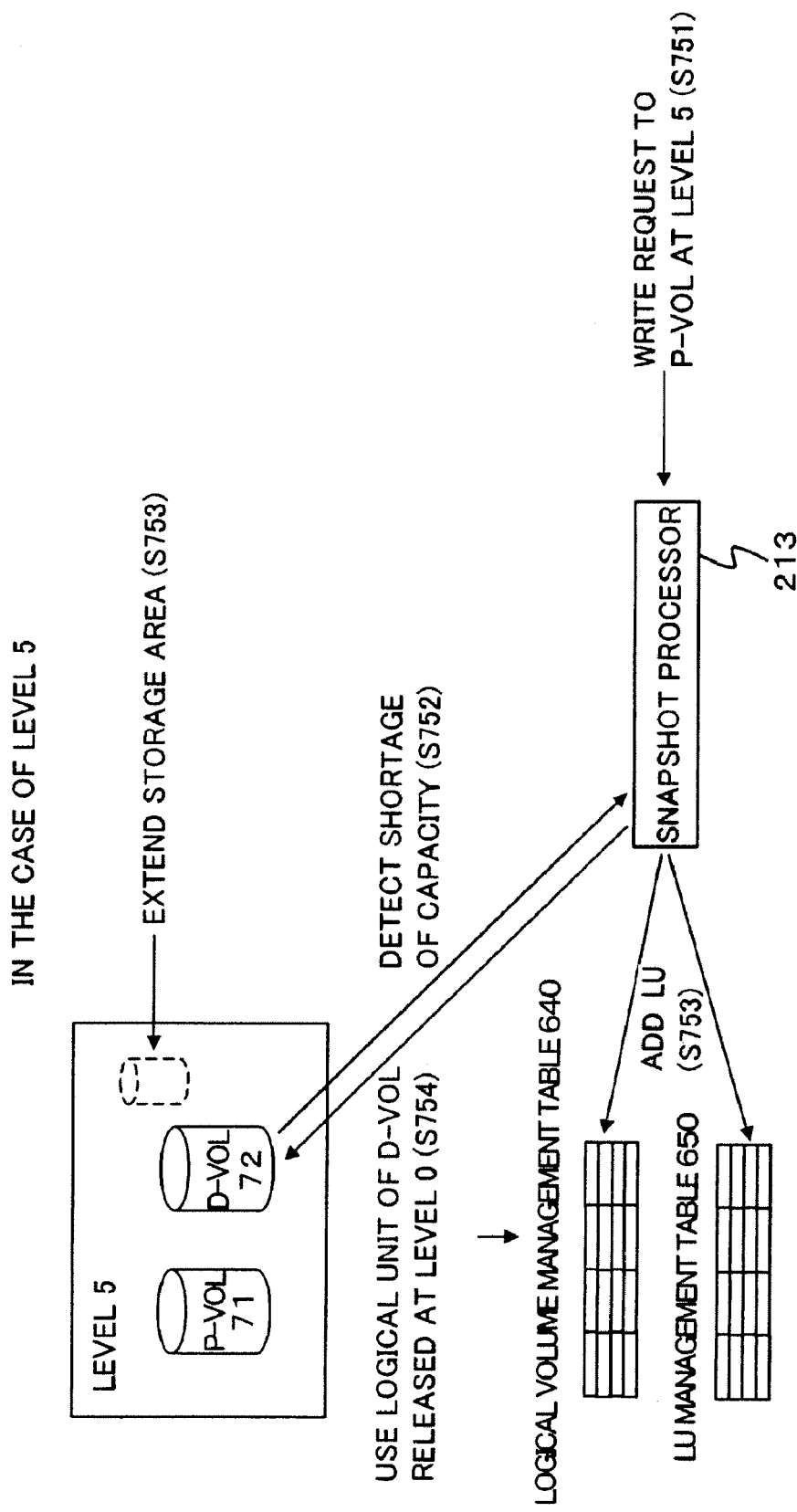
FIG. 7E is a diagram for explaining details of a Level 5 process.

FIG. 7E shows the Level 5 process in detail. As described above, Level 5 represents the management method in which, when the remaining capacity becomes equal to or less than the threshold, an LU is added to extend the storage area of D-VOL 72, and unlike Level 4 process no limit is provided to the number of times of extension (the extension is made as long as there are LUs which are allowed to be used for addition). Further, when there is no addable LU, the storage area is extended with an LU used by D-VOL 72 and released in the Level 0 process.

As shown in FIG. 7E, there is a case where the snapshot processor 213 receives a write request to the P-VOL 71 in Level 5 from the client apparatus 30 (S751). Here, when detecting that the remaining capacity of D-VOL 72 corresponding to the writing target P-VOL 71 is equal to or less than the threshold value (S752), the snapshot processor 213 updates the logical volume management table 640 and the LU management table 650 and adds an LU to extend the storage area of the D-VOL 72 (S753).

When the D-VOL 72 is repeatedly extended by adding LUs and there is no more LU for addition, the snapshot processor 213 extends the storage area of the D-VOL 72 by using an LU which has been used by D-VOL 72 and released by the Level 0 process (S754)

According to Level 5 process, since there is no limit on the number of times of extension, the storage area of the D-VOL 72 can be extended within an allowable range of storage resource. Further, the storage area of the D-VOL 72 can be extended, when necessary, by using the LU which has been used by D-VOL 72 and released in the Level 0 process. Therefore, snapshots can be safely managed for data with high level of importance.

FIG. 10A shows a screen (hereinafter, called a D-VOL management state display screen 1010) displayed on the client apparatus 30 (or a management console of the server apparatus 10). As shown in FIG. 10A, on the D-VOL management state display screen 1010, for each file system 212 (file system name 1011), displayed are a level set for the file system 212 (status 1012), an applied state of a management method to an overflow of D-VOL 72 (avoidance measure operation state 1013), and details of management method currently applied (details 1014). In FIG. 10A, when selecting one of the file system names 1011, a screen shown in FIG. 10B (hereinafter, called a file protection state display screen 1020) is displayed.

As shown in FIG. 10B, on the file protection state display screen 1020, for each snapshot (snapshot name 1021), displayed are a file name of a file set to be releasable to the snapshot (file name 1022), and contents indicating whether the file is set to be releasable (unprotected) or not releasable (protected) when applying Level 3 or 4 (status 1023).

By referring to the D-VOL management state display screen 1010, the user, the operator, or the like can know the state applied for avoiding the shortage of the storage area of the D-VOL 72 for each file system 212. Further, the user, the operator, or the like can know the protection state (releasable/not releasable) of each file by referring to the file protection state display screen 1020.

<Description of Processes>

Figure 11:
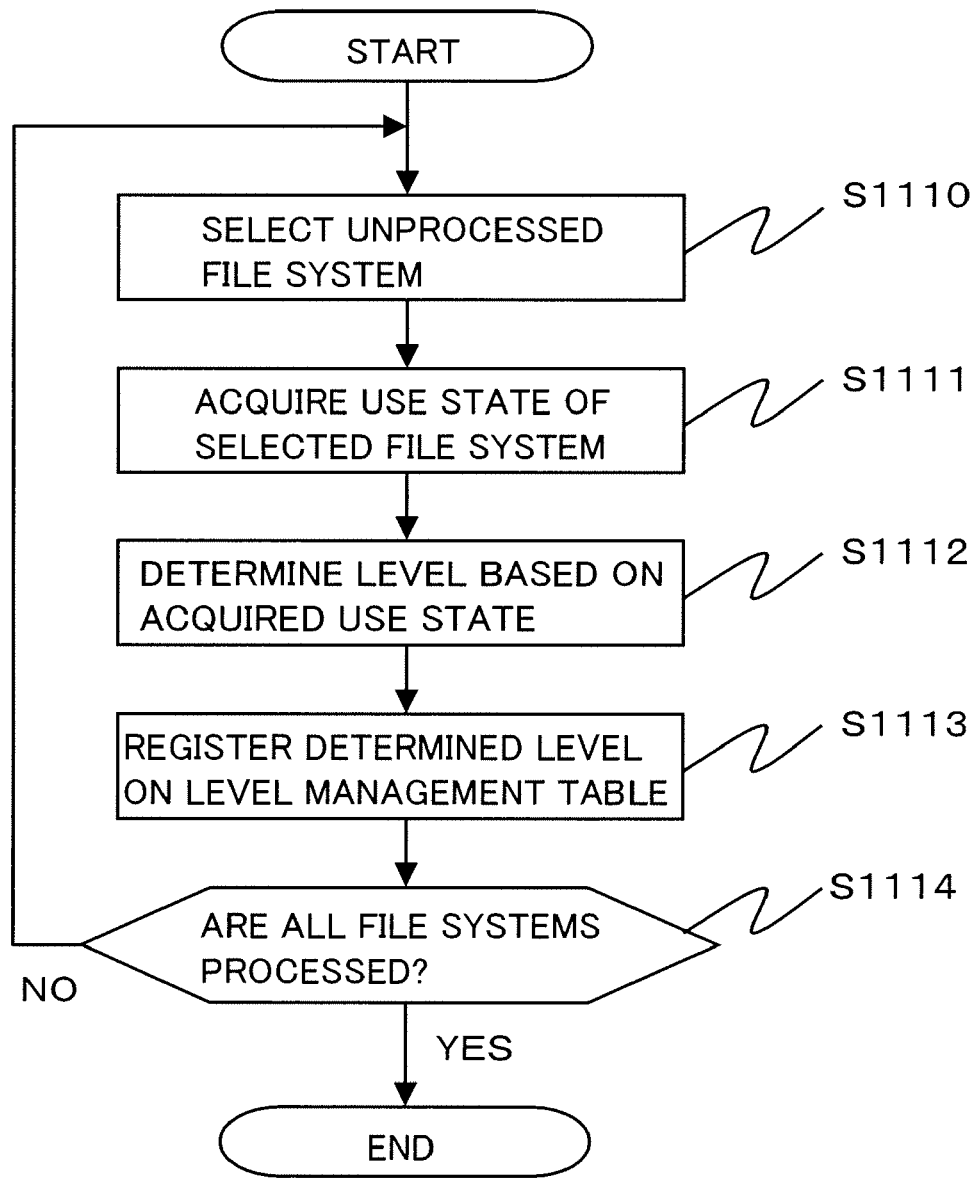
FIG. 11 is a flowchart for describing a level determination process S1100.

FIG. 11 is a flowchart for describing a process of determining a level of the file system 212 (hereinafter, called level determination process S1100), the process being performed by the level determination processor 2131 of the snapshot processor 213. The following is described with reference to FIG. 11.

First, the level determination processor 2131 selects an unprocessed file system (S1110). Subsequently, the level determination processor 2131 acquires a use state on the selected file system (S1111). As described above, the use state represents information on P-VOL 71 or D-VOL 72, e.g., the number of users accessing the P-VOL 71 (number of access users) (e.g., the number of client apparatuses 30 in access), an access frequency to the P-VOL 71 (number of times/time), a snapshot acquisition frequency (number of times/time), and a snapshot reference frequency (number of times/time). The use state is managed, for example, by the snapshot processor 213.

Next, the level determination processor 2131 determines a management method (Level) to be set to a selected file system 212 based on the acquired use state and the condition file 620 exemplified in FIG. 6B (S1112).

The level determination processor 2131 registers the set level to the level management table 610 (S1113). In addition, at this time, the level determination processor 2131 also registers the use state (e.g., the access frequency 613, the snapshot acquisition frequency 614, and the snapshot reference frequency 615) used when determining the registered level to the level management table 610.

The level determination processor 2131 determines whether levels have been set (processed) on all file systems 212 present in the server apparatus 10 (S1114). When the processing is incomplete (No in S1114), the process returns to S1110 and an unprocessed file system 212 is processed in a repetitive manner. When the processing is complete (Yes in S1114), the process is terminated.

The above-described processes are performed at suitable timing (regularly or irregularly), and a suitable management method is set to each file system 212 based on the present or recent use state.

Figure 12:
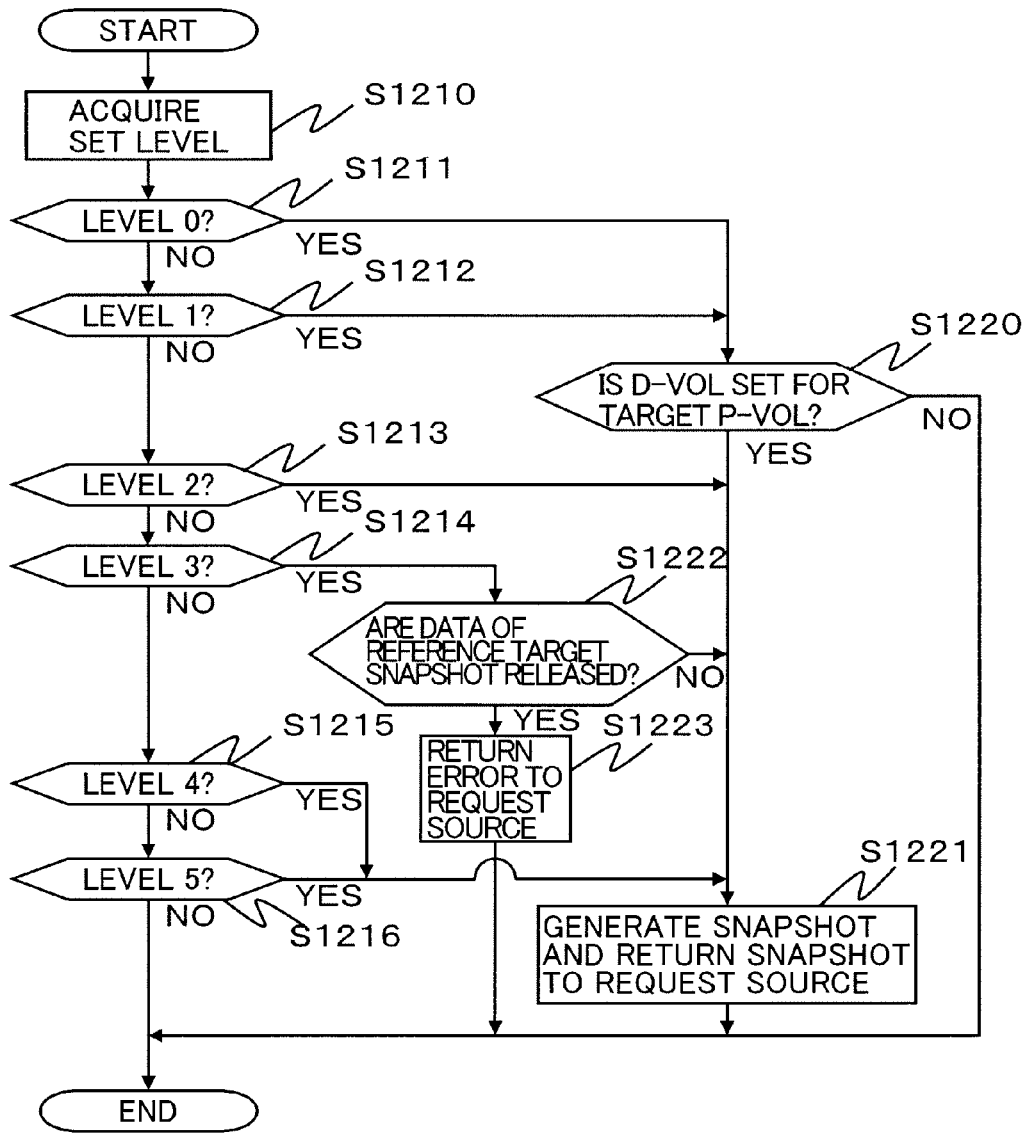
FIG. 12 is a flowchart for describing a reference request reception process S1200.

FIG. 12 is a flowchart for describing a process performed by the server apparatus 10 when receiving a reference request of a snapshot from the client apparatus 30 (hereinafter, called a reference request reception process S1200). The following is described with reference to FIG. 12.

First, the reference request processor 2133 of the snapshot processor 213 acquires a level presently set to a file system 212 to which a reference request of a snapshot has been made (S1210). The level is acquired, for example, from the level management table 610 or a log file to be described later.

Next, the reference request processor 2133 determines whether the acquired level is 0 (S1211). When the acquired level is 0 (Yes in S1211), the process moves to S1220, and when it is not 0 (No in S1211), the process moves to S1212. In S1220, it is determined whether D-VOL 72 is set for a P-VOL 71 being a reference request target. When it is determined (Yes in S1220) that the D-VOL 72 is set, the process moves to S1221, and when it is not (No in S1220), the process is terminated.

In S1221, the reference request processor 2133 generates and transmits the requested snapshot to the request source (client apparatus 30), and the process is terminated.

In S1212, it is determined whether the acquired level is 1. When the acquired level is 1 (Yes in S1212), the process moves to S1220, and when it is not 1 (No in S1212), the process moves to S1213.

In S1213, it is determined whether the acquired level is 2. When the acquired level is 2 (Yes in S1213), the process moves to S1221, and when it is not 2 (No in S1213), the process moves to S1214.

In S1214, it is determined whether the acquired level is 3. When the acquired level is 3 (Yes in S1214), the process moves to S1222, and when it is not 3 (No in S1214), the process moves to S1215.

In S1222, it is determined whether data of a reference target snapshot has been released. When the data has been released (Yes in S1222), an error message stating that the snapshot can not be referred is transmitted (S1223) to the request source (client apparatus 30). When the data has not been released (No in S1222), the process moves to S1221, and a snapshot is generated and transmitted to the request source.

In S1215, it is determined whether the acquired level is 4. When the acquired level is 4 (Yes in S1215), the process moves to S1221, and when it is not 4 (No in S1215), the process moves to S1216.

In S1216, it is determined whether the acquired level is 5. When the acquired level is 5 (Yes in S1216), the process moves to S1221, and when it is not 5 (No in S1216), the process is terminated.

As described above, once a reference request is received, the server apparatus 10 performs a suitable process in accordance with the management method set to the file system 212. Particularly, in the case of the file system 212 in Level 3, when data of the reference target has not been released, an error message is transmitted to the request source.

Figure 13A:
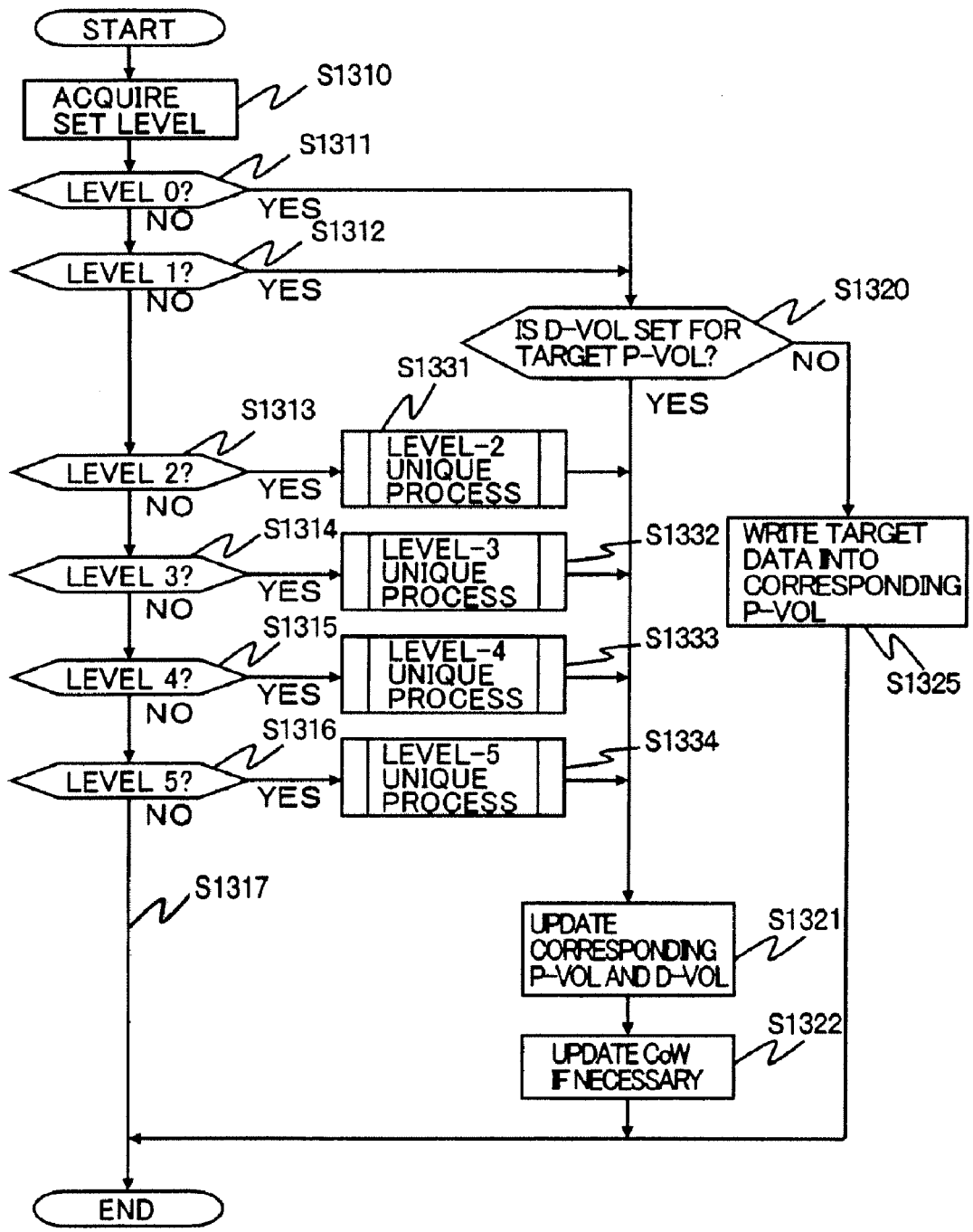
FIG. 13A is a flowchart for describing a write request reception process S1300.

FIG. 13A is a flowchart for describing a process in a case where the server apparatus 10 receives a write request to the P-VOL 71 from the client apparatus 30 (hereinafter, called write request reception process S1300). The following is described with reference to FIG. 13A.

First, the write request processor 2132 of the snapshot processor 213 acquires a Level presently set to a file system 212 to which a request of a snapshot has been made (S1310). The Level can be acquired, for example, from the level management table 610 or the log file to be described later.

Next, the write request processor 2132 determines whether an acquired level is 0 (S1311). When the acquired level is 0 (Yes in S1311), the process moves to S1320, and when it is not 0 (No in S1311), the process moves to S1312. In S1320, it is determined whether D-VOL 72 is set for a P-VOL 71 being a reference request target. When it is determined that the D-VOL 72 is set (Yes in S1320), the process moves to S1321, and when it is not (No in S1320), the process moves to S1325.

In S1321, the write request processor 2132 writes data into the P-VOL 71 being the write request target, saves differential data into the D-VOL 72, and updates the CoW bitmap 21352 (S1322) Thereafter, the process is terminated.

In S1325, the write request processor 2132 writes data into the P-VOL 71 being the write request target. Thereafter, the process is terminated.

In S1312, the write request processor 2132 determines whether the acquired level is 1. When the acquired level is 1 (Yes in S1312), the process moves to S1320, and when it is not 1 (No in S1312), the process moves to S1313.

In S1313, the write request processor 2132 determines whether the acquired level is 2. When the acquired level is 2 (Yes in S1313), the process moves to S1331, and when it is not 2 (No in S1313), the process moves to S1314. In S1331, a Level-2 unique process (FIG. 13B), described later, is performed and, thereafter, the process moves to S1321.

In S1314, the write request processor 2132 determines whether the acquired level is 3. When the acquired level is 3 (Yes in S1314), the process moves to S1332, and when it is not 3 (No in S1314), the process moves to S1315. In S1332, a Level-3 unique process (FIG. 13C), described later, is performed and, thereafter, the process moves to S1321.

In S1315, the write request processor 2132 determines whether the acquired level is 4. When the acquired level is 4 (Yes in S1315), the process moves to S1333, and when it is not 4 (No in S1315), the process moves to S1316. In S1333, a Level-4 unique process (FIG. 13D), described later, is performed and, thereafter, the process moves to S1321.

In S1316, the write request processor 2132 determines whether the acquired level is 5. When the acquired level is 5 (Yes in S1316), the process moves to S1334, and when it is not 5 (No in S1316), the process moves to S1317. In S1334, a Level-5 unique process (FIG. 13E), described later, is performed and, thereafter, the process moves to S1321.

Figure 13B:
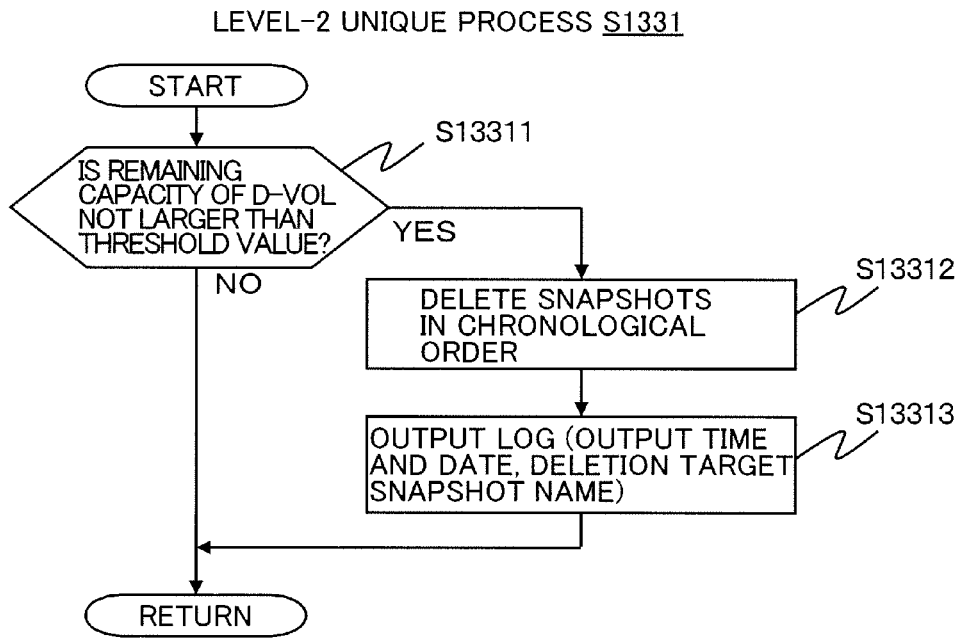
FIG. 13B is a flowchart for describing a Level-2 specific process S1331.

FIG. 13B is a flowchart for describing the Level-2 specific process S1331 shown in FIG. 13A. First, the write request processor 2132 determines whether the remaining capacity of the D-VOL 72 for the P-VOL 71 being the write request target is equal to or less than the threshold value (S13311). When the remaining capacity is equal to or less than the threshold value (Yes in S13311), the process moves to S13312. When the remaining capacity is larger than the threshold value (No in S13311), the process returns to the process of FIG. 13A (moves to S1321).

In S13312, differential data of the D-VOL 72 are deleted (initialized) in chronological order where an older time stamp is deleted first, and free space of the D-VOL 72 is increased.

In subsequent S13313, pieces of information such as the deletion of differentials data, deleted snapshot names, and deleted time and date are outputted to the log file. Thereafter, the process returns to FIG. 13A (moves to S1321).

Figure 13C:
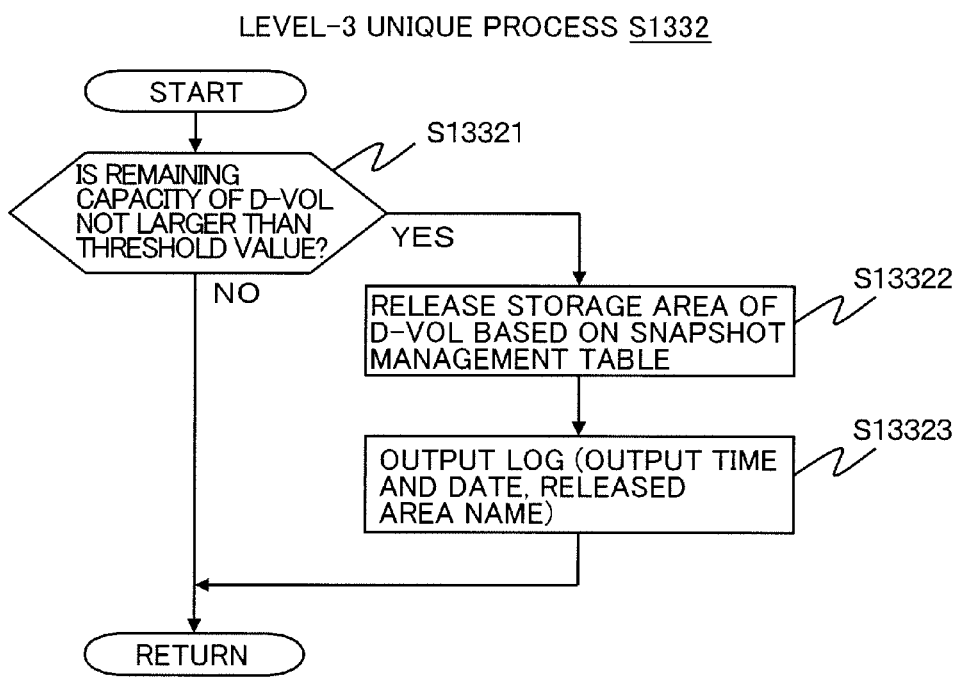
FIG. 13C is a flowchart for describing a Level-3 specific process S1332.

FIG. 13C is a flowchart for describing the Level-3 unique process S1332 shown in FIG. 13A. First, the write request processor 2132 determines whether the remaining capacity of the D-VOL 72 for the P-VOL 71 being the write request target is equal to or less than the threshold value (S13321). When the remaining capacity is equal to or less than the threshold value (Yes in S13321), the process moves to S13322. When the remaining capacity is larger than the threshold value (No in S13321), the process returns to the process of FIG. 13A (moves to S1321).

In S13322, the storage area of the D-VOL 72 is released in units of files by referring to the snapshot management table 2135.

In subsequent S13323, information identifying the released storage area (block address) and information such as released time and date are outputted to the log file. Thereafter, the process returns to the process of FIG. 13A (moves to S1321).

Figure 13D:
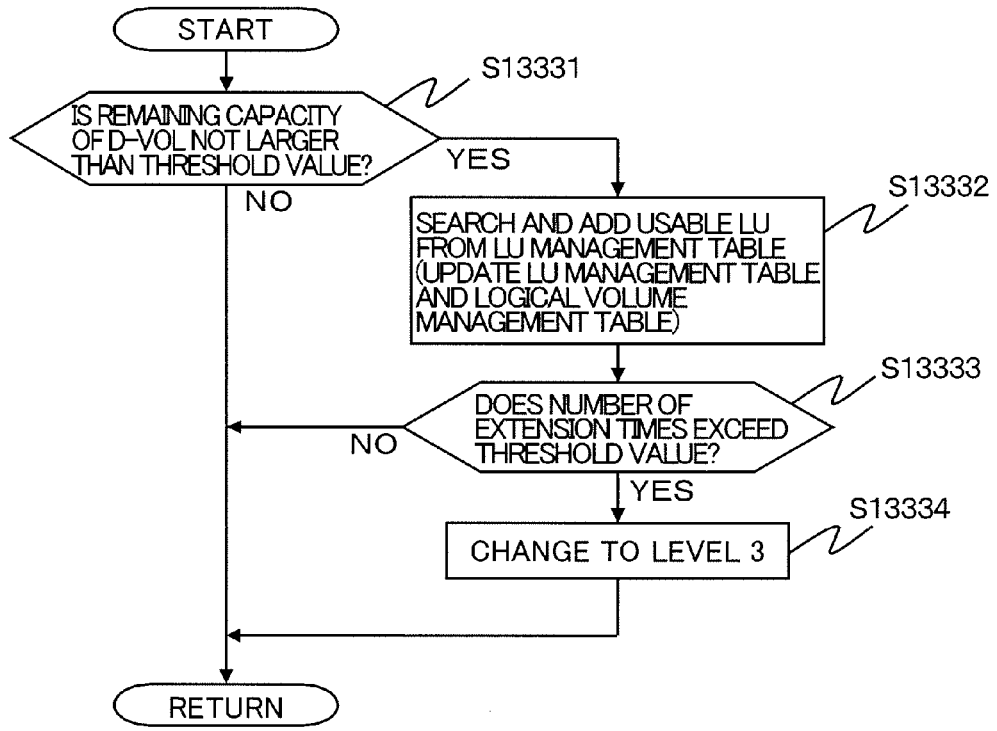
FIG. 13D is a flowchart for describing a Level-4 specific process S1333.

FIG. 13D is a flowchart for describing the Level-4 unique process S1333 shown in FIG. 13A. First, the write request processor 2132 determines whether the remaining capacity of the D-VOL 72 for the P-VOL 71 being the write request target is equal to or less than the threshold value (S13321). When the remaining capacity is equal to or less than the threshold value (Yes in S13331), the process moves to S13332. When the remaining capacity is larger than the threshold value (No in S13331), the process returns to the process of FIG. 13A (moves to S1321).

In S13332, the LU management table 650 is searched for an usable LU, and the storage area of the D-VOL 72 is extended by using the searched LU. After an extension of the storage area, the LU management table 650 and the logical volume management table 640 are updated.

In S13333, the write request processor 2132 determines whether the number of times of extension of the D-VOL 72 has exceeded a threshold value (S13333). When the number thereof has exceeded (Yes in S13333), the process moves to S13334, and when the number thereof has not exceeded (No in S13333), the process returns to the process of FIG. 13A (moves to S1321).

In S13334, the level management table 610 is updated, and the level of the corresponding file system 212 is changed to Level 3. Thereafter, the process returns to the process of FIG. 13A (moves to S1321).

Figure 13E:
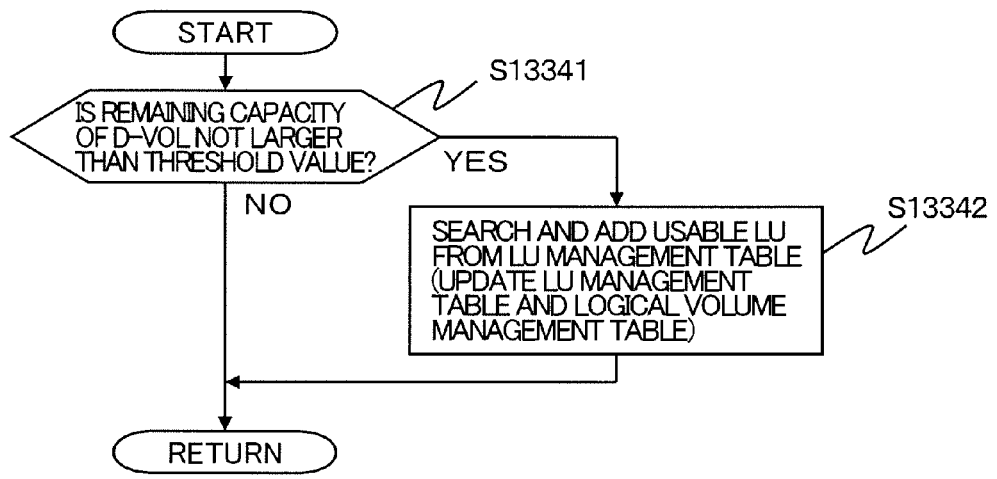
FIG. 13E is a flowchart for describing a Level-5 specific process S1334.

FIG. 13E is a flowchart for describing the Level-5 unique process (S1334) shown in FIG. 13A. First, the write request processor 2132 determines whether the remaining capacity of the D-VOL 72 for the P-VOL 71 being the write request target is equal to or less than a threshold value (S13341). When the remaining capacity is equal to or less than the threshold value (Yes in S13341), the process moves to S13342. When the remaining capacity is larger (No in S13341), the process returns to the process of FIG. 13A (moves to S1321).

In S13342, the LU management table 650 is searched for an usable LU, and the storage area of the D-VOL 72 is extended by using the searched LU. After an extension of the storage area, the LU management table 650 and the logical volume management table 640 are updated. Thereafter, the process returns to the process of FIG. 13A (moves to S1321).

According to the write request reception process S1300 described with reference to FIGS. 13A to 13E, a suitable process is performed in accordance with a Level set to the file system 212.

Figure 14:
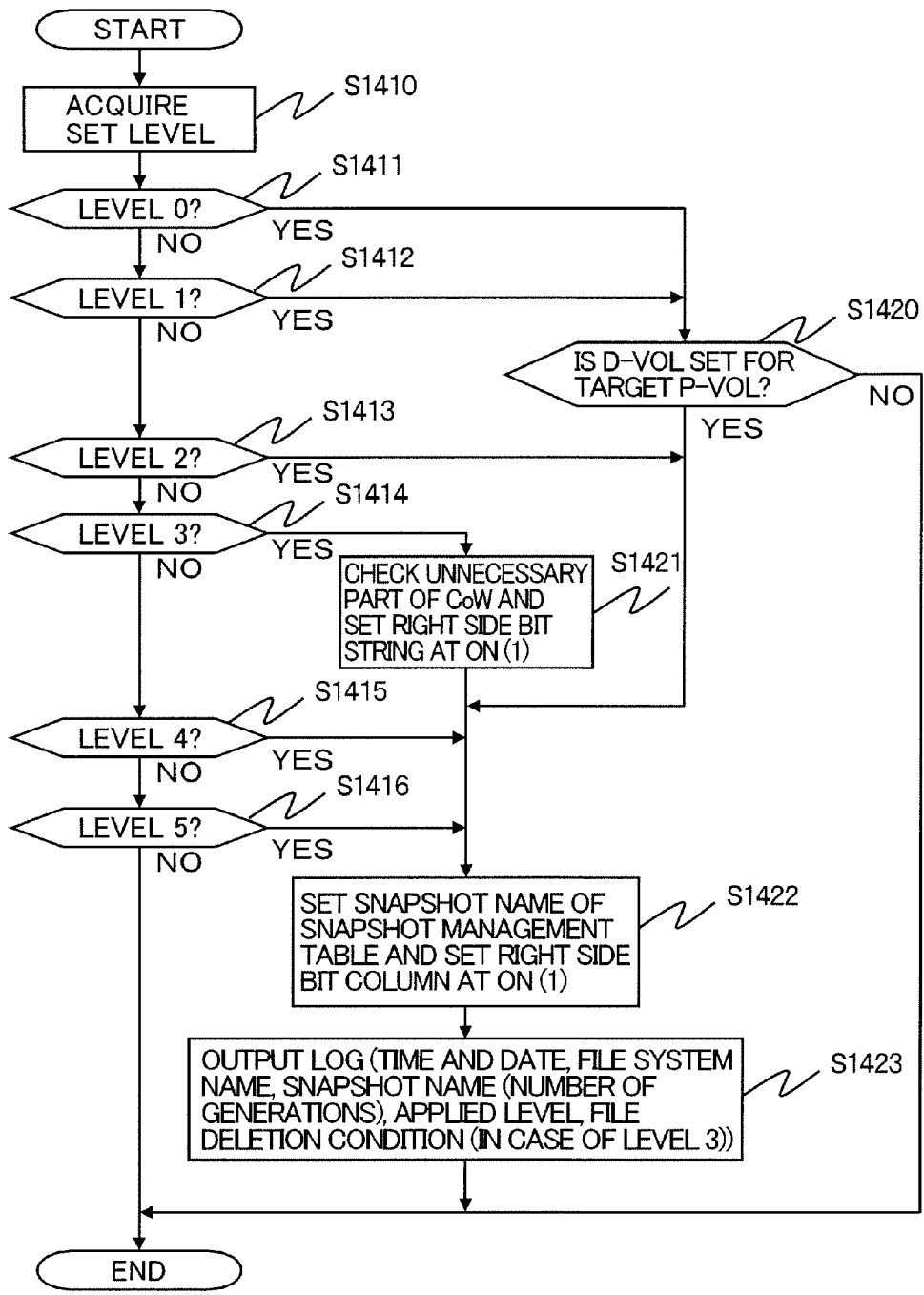
FIG. 14 is a flowchart for describing a snapshot request reception process S1400.

FIG. 14 is a flowchart for describing a process performed when the server apparatus 10 receives an acquisition request of a snapshot from the client apparatus 30 (hereinafter, called snapshot request reception process S1400).

First, the acquisition request processor 2134 of the snapshot processor 213 acquires a Level presently set to a file system 212 to which an acquisition of a snapshot has been requested (S1410). Incidentally, Levels can be acquired, for example, from the level management table 610 or the log file to be described later.

Next, the acquisition request processor 2134 determines whether the acquired level is 0 (S1411). When the acquired level is 0 (Yes in S1411), the process moves to S1420, and when it is not 0 (No in S1411), the process moves to S1412. In S1420, it is determined whether D-VOL 72 is set for a P-VOL 71 being a reference request target. When it is determined (Yes in S1420) that the D-VOL 72 is set, the process moves to S1422, and when it is not (No in S1420), the process is terminated.

In S1422, the acquisition request processor 2134 sets, to 1, a left side bit string of a block address to which an acquisition request is made in the CoW bitmap 21352 of the snapshot management table 2135, and also sets a snapshot name to the snapshot name 21353. In subsequent S1423, the acquisition request processor 2134 outputs, to the log file, a file system name and a snapshot name (number of generation) to which the acquisition request has been made, a Level set to the file system, and time and date at which the acquisition request has been made. If the Level of the file system is 3, information on file deletion condition and the like are also outputted to the log file.

In S1412, it is determined whether the acquired Level is 1. When the acquired Level is 1 (Yes in S1412), the process moves to S1420, and when it is not 1 (No in S1412), the process moves to S1413.

In S1413, it is determined whether the acquired Level is 2. When the acquired Level is 2 (Yes in S1413), the process moves to S1422, and when it is not 2 (No in S1413), the process moves to S1414.

In S1414, it is determined whether the acquired Level is 3. When the acquired Level is 3 (Yes in S1414), the process moves to S1421, and when it is not 3 (No in S1414), the process moves to S1415.

In S1421, a block address which has no need to acquire differential data in the snapshot management table is checked, and a right side bit string of the corresponding CoW bitmap is set to 1.

In S1415, it is determined whether the acquired level is 4. When the acquired level is 4 (Yes in S1415), the process moves to S1422, and when it is not 4 (No in S1415), the process moves to S1416.

In S1416, it is determined whether the acquired level is 5. When the acquired level is 5 (Yes in S1416), the process moves to S1422, and when it is not 5 (No in S1416), the process is terminated.

As described above, once receiving the acquisition request of a snapshot, the server apparatus 10 performs a suitable process in accordance with a Level set to the file system 212.

FIG. 15A shows an example of a log file outputted by the server apparatus 10 when differential data stored in the D-VOL 72 are deleted in the above processes (log file 1510). By referring to the log file 1510, a user or the like can find information on the differential data deleted from the D-VOL 72. FIG. 15B shows an example of a log file to be outputted by the server apparatus 10 when the server apparatus 10 receives an acquisition request of a snapshot from the client apparatus 30 (log file 1520). By referring to the log file 1520, the user or the like can find out what type of data (file) is a deletion target.

Accordingly, the description of the present embodiment is made to facilitate the understandings of the present invention, and is not intended to limit the present invention. It is a matter of course that the present invention may be modified or improved without departing from the scope of the invention, and includes its equivalents.

What is claimed is:

1. An information processing apparatus that performs data I/O processing on a P-VOL being a first logical volume, in response to a request from an external device comprising:
a file system configured to receive data write and read requests in unit of files from the external device;
a snapshot processing part implemented through executing a corresponding program by a processor of the information processing apparatus that is configured to store, into a D-VOL being a second logical volume, differential data generated by updating data of the P-VOL, and to manage a snapshot management table registered thereon, in association with a first block address identifying a first storage area of the P-VOL, a second block address identifying a second storage area of the D-VOL storing therein the differential data acquired for the first address, to reproduce a snapshot representing a state of the P-VOL at a certain time,
wherein the snapshot processing part is configured to manage the D-VOL in accordance with a management method, which is any one of the following, listed in an order of increasing priority:
a zeroth method, in which a storage area of the D-VOL is freed to be used as a storage area for newly acquired differential data in response to an external request;
a first method, in which the storage area of the D-VOL is automatically freed to be used as a storage area for the newly acquired differential data when a remaining capacity of the storage area of the D-VOL becomes equal to or less than a predetermined threshold value;
a second method, in which, of the storage areas storing differential data, those storing old differential data are initialized to be used, in chronological order, as a storage area for newly acquired differential data when the remaining capacity of the storage area of the D-VOL becomes equal to or less than the predetermined threshold value;
a third method, in which a block of the D-VOL, the block storing therein differential data on a certain predetermined file, is freed to be used as a storage area for newly acquired differential data when the remaining capacity of the storage area of the D-VOL becomes equal to or less than the predetermined threshold value;
a fourth method, in which the storage area of the D-VOL is extended by adding a logical unit for a predetermined number of times when the remaining capacity of the storage area of the D-VOL becomes equal to or less than a predetermined threshold value; and a block of the D-VOL in which the differential data on a certain predetermined file had been stored is freed to be used as a storage area for newly acquired differential data when the adding exceeds the predetermined number of times and the remaining capacity becomes equal to or less than the predetermined threshold value; and
a fifth method, in which a logical unit is automatically added when the remaining capacity of the storage area of the D-VOL becomes equal to or less than a predetermined threshold value; and
wherein the methods are determined based on a use state comprising at least one of a number of access users, an access frequency, and a number of times of snapshot reference.

2. The information processing apparatus according to claim 1,
wherein the snapshot processing part is configured to free a block of the D-VOL, the block storing therein differential data on a certain predetermined generation of the certain file, to be used as a storage area for newly acquired differential data when the remaining capacity of the storage area of the D-VOL becomes equal to or less than a threshold value.

3. The information processing apparatus according to claim 1,
wherein the snapshot processing part
is configured to extend the storage area of the D-VOL by adding a logical unit for a predetermined number of times when the remaining capacity of the storage area of the D-VOL becomes equal to or less than a predetermined threshold value, and
is configured to free the block of the D-VOL in which the differential data on a certain predetermined file had been stored to be used as a storage area for newly acquired differential data when the adding exceeds the predetermined number of times and the remaining capacity becomes equal to or less than the predetermined threshold value.

4. An information processing apparatus configured to perform data I/O processing on a P-VOL being a first logical volume, in response to a request from an external device comprising:

a file system configured to receive data write and read requests in unit of files from the external device;

a snapshot processing part implemented through executing a corresponding program by a processor of the information processing apparatus that is configured to store, into a D-VOL being a second logical volume, differential data generated by updating data of the P-VOL, and to manage a snapshot management table registered thereon, in association with a first block address identifying a first storage area of the P-VOL, a second block address identifying a second storage area of the D-VOL storing therein the differential data acquired for the first address, to reproduce a snapshot representing a state of the P-VOL at a certain time and a level determination processing part implemented through executing a corresponding program by a processor of the information processing apparatus configured to determine a management method for the D-VOL, wherein the snapshot processing part is configured to manage the D-VOL in accordance with the management method, which is any one of the following, listed in an order of increasing priority:

a zeroth method, in which a storage area of the D-VOL is freed to be used as a storage area for newly acquired differential data in response to an external request;

a first method, in which the storage area of the D-VOL is automatically freed to be used as a storage area for the newly acquired differential data when a remaining capacity of the storage area of the D-VOL becomes equal to or less than a predetermined threshold value;

a second method, in which, of the storage areas storing differential data, those storing old differential data are initialized to be used, in chronological order, as a storage area for newly acquired differential data when the remaining capacity of the storage area of the D-VOL becomes equal to or less than the predetermined threshold value;

a third method, in which a block of the D-VOL, the block storing therein differential data on a certain predetermined file, is freed to be used as a storage area for newly acquired differential data when the remaining capacity of the storage area of the D-VOL becomes equal to or less than the predetermined threshold value;

a fourth method, in which the storage area of the D-VOL is extended by adding a logical unit for a predetermined number of times when the remaining capacity of the storage area of the D-VOL becomes equal to or less than a predetermined threshold value; and a block of the D-VOL in which the differential data on a certain predetermined file had been stored is freed to be used as a storage area for newly acquired differential data when the adding exceeds the predetermined number of times and the remaining capacity becomes equal to or less than the predetermined threshold value; and a fifth method, in which a logical unit is automatically added when the remaining capacity of the storage area of the D-VOL becomes equal to or less than a predetermined threshold value, wherein the methods are determined based on a use state comprising at least one of a number of access users, an access frequency, and a number of times of snapshot reference.

5. The information processing apparatus according to claim 4, wherein the level determination processing part determines a D-VOL management method, based on a use state of the P-VOL and the D-VOL.

6. The information processing apparatus according to claim 5, wherein the use state is at least one of a frequency of access to the P-VOL, a frequency of acquisition of a snapshot on the P-VOL, and a frequency of reference of a snapshot on the P-VOL.

7. The information processing apparatus according to claim 5, wherein the level determination processing part is configured to store conditions for determining the management method of the D-VOL based on the use states of the P-VOL and the D-VOL.

8. The information processing apparatus according to claim 4, wherein the level determination processing part is configured to determine a management method received via a user interface as the management method for the file system.

9. A method for operating a storage system including a server apparatus coupled to a client apparatus and a storage apparatus coupled to the server apparatus, the server apparatus configured to perform data I/O processing on a P-VOL being a first logical volume, in response to a request from the client apparatus, and being provided with a file system which receives data write and read requests in a unit of files from the client apparatus, the method comprising:

a storing step, implemented by the server apparatus, comprising:

storing into a D-VOL being a second logical volume, differential data generated by updating data of the P-VOL, and managing a snapshot management table registered thereon, in association with a first block address identifying a first storage area of the P-VOL, a second block address identifying a second storage area of the D-VOL storing there in the differential data acquired for the first address, to reproduce a snapshot representing a state of the P-VOL at a certain time; and wherein the D-VOL is managed, using at least one computer, in accordance with a management method, which is any one of the following, listed in an order of increasing priority:

a zeroth method, in which a storage area of the D-VOL is freed to be used as a storage area for newly acquired differential data in response to an external request;

a first method, in which the storage area of the D-VOL is automatically freed to be used as a storage area for the newly acquired differential data when a remaining capacity of the storage area of the D-VOL becomes equal to or less than a predetermined threshold value;

a second method, in which, of the storage areas storing differential data, those storing old differential data are initialized to be used, in chronological order, as a storage area for newly acquired differential data when the remaining capacity of the storage area of the D-VOL becomes equal to or less than the predetermined threshold value;

a third method, in which a block of the D-VOL, the block storing therein differential data on a certain predetermined file, is freed to be used as a storage area for newly acquired differential data when the remaining capacity of the storage area of the D-VOL becomes equal to or less than the predetermined threshold value;

a fourth method, in which the storage area of the D-VOL is extended by adding a logical unit for a predetermined number of times when the remaining capacity of the storage area of the D-VOL becomes equal to or less than a predetermined threshold value; and a block of the D-VOL in which the differential data on a certain predetermined file had been stored is freed to be used as a storage area for newly acquired differential data when the adding exceeds the predetermined number of times and the remaining capacity becomes equal to or less than the predetermined threshold value; and a fifth method, in which a logical unit is automatically added when the remaining capacity of the storage area of the D-VOL becomes equal to or less than a predetermined threshold value; and wherein the methods are determined based on a use state comprising at least one of a number of access users, an access frequency, and a number of times of snapshot reference.

10. The method for operating the storage system according to claim 9, wherein the server apparatus is configured to free a block of the D-VOL, the block storing therein differential data on a certain predetermined generation of the certain file, to be used as a storage area for newly acquired differential data when the remaining capacity of the storage area of the D-VOL becomes equal to or less than a threshold value.

11. The method for operating the storage system according to claim 9, wherein the server apparatus is configured to extend the storage area of the D-VOL by adding a logical unit for a predetermined number of times when the remaining capacity of the storage area of the D-VOL becomes equal to or less than a predetermined threshold value and is configured to free the block of the D-VOL wherein the differential data on a certain predetermined file had been stored to be used as a storage area for newly acquired differential data when the adding exceeds the predetermined number of times and the remaining capacity becomes equal to or less than the predetermined threshold value.

* * * * *